United States Patent
Kim et al.

(10) Patent No.: US 7,441,666 B2
(45) Date of Patent: Oct. 28, 2008

(54) PROCESS FOR PRODUCING AN ASYMMETRIC POROUS FILM

(75) Inventors: Sung-Teh Kim, Fukuoka (JP); Chieko Yamamoto, Fukuoka (JP); Toshinori Koizumi, Miyazaki (JP); Masatoshi Saitoh, Miyazaki (JP); Shunji Maniwa, Miyazaki (JP)

(73) Assignee: Asahi Kasei Kuraray Medical Co., Ltd., Tokyo (JP)

( * ) Notice: Subject to any disclaimer, the term of this patent is extended or adjusted under 35 U.S.C. 154(b) by 329 days.

(21) Appl. No.: 10/475,265

(22) PCT Filed: Apr. 18, 2002

(86) PCT No.: PCT/JP02/03883

§ 371 (c)(1),
(2), (4) Date: Apr. 7, 2004

(87) PCT Pub. No.: WO02/087735

PCT Pub. Date: Nov. 7, 2002

(65) Prior Publication Data

US 2004/0167237 A1   Aug. 26, 2004

(30) Foreign Application Priority Data

Apr. 18, 2001 (JP) ............................. 2001-119817
Mar. 22, 2002 (JP) ............................. 2002-081803

(51) Int. Cl.
*B01D 29/00* (2006.01)
*B01D 71/68* (2006.01)
*B01D 71/26* (2006.01)
*B01D 71/28* (2006.01)

(52) U.S. Cl. ............... 210/490; 210/506; 210/500.21; 210/500.41; 210/500.27

(58) Field of Classification Search ............... 210/490, 210/506, 500.23, 500.24, 500.41, 500.42, 210/500.21, 500.27; 264/41, 49; 96/4, 11, 96/12
See application file for complete search history.

(56) References Cited

U.S. PATENT DOCUMENTS 4,882,223 A * 11/1989 Aptel et al. ............... 428/398
5,304,307 A * 4/1994 Linder et al. ............... 210/490

(Continued)

FOREIGN PATENT DOCUMENTS

JP        60-087803        5/1985

(Continued)

*Primary Examiner*—Krishnan S. Menon
*Assistant Examiner*—Benjamin Kurtz
(74) *Attorney, Agent, or Firm*—Young & Thompson

(57) ABSTRACT

It is intended to provide asymmetric porous films which are usable in blood dialysis, plasma separation, etc. and particularly excellent in the performance of selectively separating (fractionating) plasma protein, show little endogenous coagulation, complement or quinine activily and have an extremely high biocompatibility. Porous films made mainly of a synthetic polymer and having an asymmetric structure wherein, in the sectional structure, a dense layer substantially not charged at least on the outermost surface is provided in the side on which a liquid to be treated is loaded and at least part of the film other than the outermost surface is negatively charged. In the above films, the dense layer non-charged at least on the outermost surface serves as a size barrier while the part of the film other than the outermost surface serves as a charge barrier.

2 Claims, 3 Drawing Sheets

U.S. PATENT DOCUMENTS

| | | | |
|---|---|---|---|
| 5,683,584 A * | 11/1997 | Wenthold et al. | 210/500.23 |
| 6,177,011 B1 * | 1/2001 | Hachisuka et al. | 210/500.38 |
| 6,183,640 B1 * | 2/2001 | Wang | 210/500.41 |
| 6,258,272 B1 * | 7/2001 | Wang et al. | 210/500.41 |
| 6,945,411 B1 * | 9/2005 | Bormann et al. | 210/491 |

FOREIGN PATENT DOCUMENTS

| | | |
|---|---|---|
| JP | 62-019205 | 1/1987 |
| JP | 04-176330 | 6/1992 |

\* cited by examiner

Loading liquid side (a)
(b)
(c)

Permeated liquid side

Liquid permeation direction

PROCESS FOR PRODUCING AN ASYMMETRIC POROUS FILM

TECHNICAL FIELD

The present invention relates to an asymmetric porous membrane for separating specific solutes and/or dispersoids from a liquid and to a method for manufacturing the same.

The asymmetric porous membrane of the present invention exhibits remarkably improved performance to separate solutes and/or dispersoids from a liquid to be processed and possesses a membrane structure excelling in biocompatibility. The asymmetric porous membrane therefore can be suitably used particularly when the liquid to be processed is blood and is most suitably used as a separating membrane for extracorporeal circulation such as dialysis treatment.

BACKGROUND ART

Separation using a membrane has been commonly employed for separating or condensing a specific solute from a multi-dispersion fluid consisting of a solvent and many types of solutes and/or dispersoids (hereinafter simply referred to as "solutes"). As the separation method, "size barrier separation" to separate a solute according to the size by producing pores with a specific size in the membrane and "charge barrier separation" to separate a solute using a charged membrane and causing the solute to electrically repulse according to charges possessed by the solute have been known. In addition, as the separation method using a membrane, methods utilizing the difference in properties exhibited by solutes when treated with a membrane such as the adsorption force, ion-exchange capacity, and solubility-dispersiblity have been known. These separation methods are widely used in industries for desalting, water processing, food and pharmaceutical manufacturing, gas separation, and the like.

Blood purification therapy is carried out as a medical treatment for removing various toxins accumulated in blood with an objective of improving diseases such as renal failure and hepatic failure. The method of separation using a membrane have been applied to the Blood purification therapy. The blood purification therapy has a long history in artificial kidneys used for treating chronic or acute renal failures. Various artificial kidney membranes using collodion flat membranes, hollow fiber membranes made from synthetic polymers, and the like have been put in to practice. A method utilizing a blood processing membrane with a larger pore diameter is also used for blood purification such as plasma exchange and fractionating blood plasma components.

These blood processing membranes for extracorporeal circulation include a dialysis membrane, filtration membrane, diafiltration membrane, and the like. Suppressing pore blockage due to adsorption of plasma proteins and preventing protein denaturation due to contact with the membrane are demanded first of all for blood processing using a separating membrane. To this end, it has been necessary to make the membrane surface including pores coming in contact with blood hydrophilic.

On the other hand, efficiently removing wastes from blood is essential for a dialysis separating membrane of artificial kidneys used for treating renal insufficiency diseases. In recent years, as a result of the process for identifying wastes to be removed and ascertaining substances causing various complications accompanying a long-term or short-term dialysis, the substances to be removed now include, in addition to low molecular weight compounds such as urea and ammonia that have been removed in conventional dialysis, low molecular weight plasma proteins such as $\beta2$-microglobulin (hereinafter referred to as $\beta2$MG) and advanced glycation end products (hereinafter referred to as AGE).

In view of this situation, various high performance blood processing membranes have been made commercially available. Major membrane materials include natural polymers such as regenerated cellulose and its modified product, cellulose polymers such as cellulose acetate, and synthetic polymers such as a polyacrylonitrile-based polymer, polymethylmethacrylate-based polymer, polyamide-based polymer, polysulfone-based polymer, and ethylene-vinyl alcohol copolymer.

In terms of the structure, membranes are broadly classified into homogeneous membranes with a dense structure as a whole and inhomogeneous (asymmetric) membranes consisting of a dense selective separating layer and a porous supporting layer. From the viewpoint of permeability, the latter membranes are more preferable due to the least permeation resistance and the capability of ensuring physical membrane strength by the supporting layer.

Among these, a hydrophobic aromatic polysulfone-based polymer is gaining its position as a representative membrane material in recent years due to the versatility as a resin material, strength as a structural material, resistance to sterilization treatment with heat or radiation, and superior controllability of the pore diameter and membrane structure when manufacturing the membrane. However, since the aromatic polysulfone-based polymer is highly hydrophobic and, therefore, affects the blood clotting system, deaeration, and the like, this polymer is blended with hydrophilic polyvinyl pyrrolidone (hereinafter referred to as PVP) for use as a hollow separating membrane. This membrane has been regarded to be free from the complement activity that has been reported to occur when an untreated cellulose membrane comes into contact with blood and from the physiological activity harmful to the human body such as anaphylaxis caused by bradykinin production that occurs under specific conditions during dialysis using a polyacrylonitrile membrane with negative charges.

The PVP-blend polysulfone membrane can be manufactured in a wet spinning process comprising extruding a dope blend of an aromatic polysulfone-based polymer and water soluble PVP from the outer cylinder of a cylindical nozzle, causing the spun material to come into contact with an aqueous coagulant to effect phase separation, and removing the phase containing a large amount of PVP formed by the phase separation from the system.

Although it is possible to control the average pore size on the membrane surface that comes into contact with blood by changing the composition of the aqueous coagulant in this method, the pore size distribution on the surface of the resulting separating membrane tends to become wide due to fluctuations in the PVP molecular weight distribution and the polymer concentration in the dope, the shear force when the dope is discharged, and the like. For this reason, when low molecular weight plasma proteins are removed at a high ratio using this separating membrane, albumin which is a plasma protein useful for the human body is unnecessarily removed.

In addition, since a part of PVP that remains in the resulting separating membrane must be removed using a large amount of solvent and taking a long period of time in the membrane manufacturing process to prevent elution from the membrane during blood processing. This poses serious problems in the manufacturing process such as a decrease in productivity and requirement for processing a large amount of waste liquid.

In an effort to overcome these drawbacks, a method for separating plasma proteins with different isoelectric points using a separating membrane with negatively charged groups introduced on the surface, simulating a renal glomerular basement membrane, has been investigated and developed. Okayama Medical Journal, Vol. 105, 317(1993) reports separation of three plasma proteins with a molecular weight in the range of 14,300-66,000 having different isoelectric points using a negatively charged membrane for dialysis made from an ethylene-vinyl alcohol copolymer with sulfonic acid groups introduced in the membrane surface. The report describes that the sieving coefficient for plasma proteins with different isoelectric points varies and permeation selectivity by negative charges can be improved by increasing the quantity of negative charges in the membrane.

Japanese Patent Application Laid-open No. 5-131125 discloses that a hemodialysis membrane made from a blend of a sulfonated aromatic polysulfone-based polymer and an aromatic polysulfone-based polymer exhibits a high sieving coefficient for β2MG and a low sieving coefficient for albumin at the same time. In this manner, ultrafilter membranes having negatively charged groups on the surface that comes into contact with blood are known to exhibit high selective permeability for plasma proteins.

However, as physiologically well known, negatively charged groups, when brought into contact with blood, activate the coagulation factor XII, one of the intrinsic clotting factors, and the resulting fragment XIIa activates the coagulation factor XI in the presence of high molecular weight kininogen (e.g. E. Cenni, et al. "Biomaterials and Bioengineering Handbook" Chap. 8, 205, D. L. Wise ed., Mercel Dekker, New York, (2000) and Kidney Int. 1999 March 55(3) 11097-103). This activation acts as a trigger to activate the cascade for the intrinsic blood clotting system. The factor XIIa converts prekallikrein into kalliklein, which acts on high molecular weight kininogen to produce bradykinin (hereinafter abbreviated to BKN). The produced BKN induces an anaphylactoid reaction such as a slight fever and anesthesia of fingers and lips, when used in hemodialysis treatment. Therefore, direct contact of negatively charged groups with blood must be avoided in hemodialysis.

Japanese Patent Application Laid-open No. 8-505311 discloses a method for suppressing production of bradykinin using a membrane made from a polymer blend of a non-sulfonated polysulfone-based polymer and a sulfonated aromatic polysulfone-based polymer, wherein the product of the sulfonation degree of the sulfonated polysulfone-based polymer and the content of the sulfonated polysulfone-based polymer in the blend is 100 or less. However, use of this method of reducing the total sulfonic acid residues results in a decrease in the selective permeability of proteins, which is inevitably accompanied by a decrease in the cut off performance. In addition, the degree of the bradykinin production control disclosed in the patent application is simply lower than in the case where the polymer blend contains a large amount of sulfonated polysulfone. This does not necessarily indicate that the amount of bradykinin production is decreased to the extent not affecting the living body. Specifically, it is not known whether or not the amount of bradykinin production is a level safe for use in artificial kidneys.

Japanese Patent Application Laid-open No. 11-313886 discloses a method of using a neutral or cationic polymer for a semipermeable membrane for dialysis based on a negatively charged polyacrylonitrile to prevent activation of blood or plasma when coming in contact with the semipermeable membrane. Because negative charges on the pore surfaces all over the membrane are covered with a neutral or cationic polymer in this method, the amount of bradykinin production after the treatment is expected to decrease. However, the membrane does not have sufficient fractionation performance due to small negative charges of the semipermeable membrane for dialysis using the polyacrylonitrile as a base material.

In this manner, any conventional methods cannot provide a separating membrane having a sufficient cut off performance, while suppressing side effects on biological systems due to direct contact of the negatively charged groups with blood.

DISCLOSURE OF THE INVENTION

An object of the present invention is to provide an asymmetric porous membrane excelling in selective separation (cut off) performance of plasma proteins, exhibiting almost no endogenous coagulation activity, complementary activity, and quinine activity, remarkably excelling in biocompatibility, and usable in hemodialysis, plasma separation, and the like. In particular, a first object of the present invention is to provide an asymmetric porous membrane using, as a base material, a synthetic polymer that can separate human serum albumin with a molecular weight of about 67,000 from proteins with a molecular weight in the range of 30,000-40,000 represented by AGE at a high precision.

A second object of the present invention is to provide a method for manufacturing an asymmetric porous membrane having both biocompatibility and selective separation capability.

In view of the above situation, the inventors of the present invention have conducted extensive studies on asymmetric porous membranes formed mainly from synthetic polymers. As a result, the inventors have found that the above objects can be achieved by providing a dense layer substantially free from electric charges at least on the outermost surface on the side on which a liquid to be processed is loaded and by causing at least a part of the membrane other than the outermost surface to be negatively charged. This finding has led to the completion of the present invention.

In the present invention, the dense layer substantially free from electric charges present at least on the outermost surface functions as a size barrier (sieving function according to the molecular size) and the part of the membrane other than the outermost surface functions as a charge barrier (sieving function according to repulsion of charges).

Therefore, the present invention relates to:

(1) an asymmetric porous membrane mainly formed from a synthetic polymer having a cross-sectional structure, wherein a dense layer substantially free from electric charges is present at least on the outermost surface on the side on which a liquid to be processed is loaded and at least part of the membrane other than the outermost surface is negatively charged, (2) the asymmetric porous membrane described in (1) above, wherein the dense layer is substantially free from electric charges in its entirety, (3) the asymmetric porous membrane described in (2) above, wherein negative charges are densely present immediately below the dense layer, (4) the asymmetric porous membrane described in (2) above, wherein negative charges are present all over the membrane except for the dense layer, (5) the asymmetric porous membrane described in any one of (1)-(4) above, wherein the negative charges are originated from a charged polymer different from the synthetic polymer forming the porous membrane, (6) the asymmetric porous membrane described in any one of (1)-(4) above, wherein the negative charges are originated from the synthetic polymer mainly forming the part of the porous membrane excluding the dense layer, (7) the asymmetric porous membrane described in (1) above, wherein only the outermost surface of the dense layer is substantially free from electric charges, (8) the asymmetric porous membrane described in (7) above, wherein the negative charges are densely present immediately below the outermost surface layer, (9) the asymmetric porous membrane described in (7) above, wherein the negative charges are present all over the membrane except for the outermost surface of dense layer,

(10) the asymmetric porous membrane described in any one of (7)-(9) above, wherein the negative charges are originated from a charged polymer different from the synthetic polymer forming the porous membrane,

(11) the asymmetric porous membrane described in any one of (7)-(9) above, wherein the negative charges are originated from the synthetic polymer mainly forming the part of the porous membrane excluding the outermost surface of the dense layer,

(12) the asymmetric porous membrane described in (6) or (11) above, wherein the synthetic polymer possessing negative charges has a zeta potential at pH 7.4 of −2 mV or less, as measured for a substrate film obtained from the polymer,

(13) the asymmetric porous membrane described in (12) above, wherein the synthetic polymer possessing the negative charges is a polysulfone-based polymer containing at least one polymer selected from the group consisting of sulfonated polysulfone-based polymers and aliphatic polysulfone-based polymers,

(14) the asymmetric porous membrane described in (13) above, wherein the sulfonated polysulfone-based polymers are at least one polymer selected from the group consisting of sulfonated aromatic polysulfone-based polymers, sulfonated aliphatic polysulfone-based polymers, and sulfonated products of a copolymer of a hydrophilic polymer and an aromatic polysulfone-based polymer,

(15) the asymmetric porous membrane described in any one of (1)-(14) above, wherein the layer substantially free from electric charges is made from a non-charged hydrophilic material,

(16) the asymmetric porous membrane described in (15) above, wherein the non-charged hydrophilic material is at least one polymer selected from the group consisting of hydrophilic polymers, mixtures of a hydrophilic polymer and an aromatic polysulfone-based polymer, and copolymers of a hydrophilic polymer and an aromatic polysulfone-based polymer,

(17) the asymmetric porous membrane described in (16) above, wherein the hydrophilic polymer is a linear or branched alkylene oxide polymer or polyvinyl pyrrolidone,

(18) the asymmetric porous membrane described in any one of (1)-(17) above, wherein the membrane separates a plurality of solutes and/or dispersoids in the liquid to be processed by filtration and/or diffusion,

(19) the asymmetric porous membrane described in (18) above, wherein the membrane is a membrane for dialyzing blood and/or a membrane for filtering blood,

(20) a method for manufacturing the asymmetric porous membrane described in any one of (1)-(5) above, comprising providing a porous substrate membrane with an asymmetric structure mainly made from a synthetic polymer substantially free from electric charges and having a dense layer on the side on which a liquid is loaded and filtering or diffusing a solution of a negatively charged polymer that can be blocked by the dense layer from the side opposite to the dense layer to block the negatively charged polymer from permeating through the dense layer, thereby introducing negative charges to the part excluding the dense layer and immobilizing the negatively charged material to the part excluding the dense layer,

(21) the method described in (20) above, wherein the negative charges are introduced at a high density immediately below the dense layer by blocking the negatively charged polymer immediately below the dense layer,

(22) a method for manufacturing the asymmetric porous membrane described in anyone of (1), (2), (4), and (6)-(19) above, comprising forming a porous substrate membrane from a polymer solution containing a synthetic polymer having negative charges as a main component, causing the surface of the substrate membrane to come in contact with a solution of a synthetic polymer substantially free from electric charges, and coagulating the polymer to form a layer substantially free from electric charges,

(23) a method for manufacturing the asymmetric porous membrane described in any one of (1)-(19) above, comprising extruding a polymer solution containing a synthetic polymer having negative charges as a main component from the outer cylinder of a double cylindical spinneret and injecting a solution of a synthetic polymer substantially free from electric charges and exhibiting an action of coagulating the above synthetic polymer from the inner cylinder of the double cylindical spinneret, and

(24) a method for manufacturing the asymmetric porous membrane described in any one of (1)-(19) above, comprising injecting a polymer solution containing a synthetic polymer having negative charges as a main component from the outer cylinder of a triple cylindical spinneret, injecting a solution of a synthetic polymer substantially free from electric charges from the middle cylinder of the triple cylindical spinneret, and injecting a solvent exhibiting an action of coagulating the synthetic polymer having negative charges and the synthetic polymer substantially free from electric charges from the inner cylinder of the triple cylindical spinneret.

DETAILED DESCRIPTION OF THE INVENTION AND PREFERRED EMBODIMENT

Figure 1:
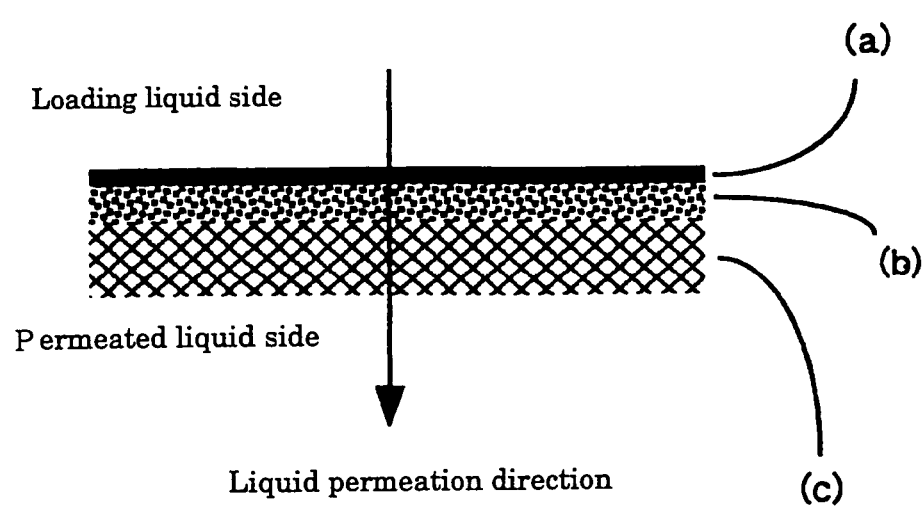
FIG. 1 is a schematic sectional view showing one embodiment of the asymmetric porous membrane of the present invention.

Although any synthetic polymer commonly used as a separating membrane can be used without specific limitations for the synthetic polymer mainly forming the asymmetric porous membrane of the present invention, synthetic polymers preferably used for processing blood is desirable. Specifically, the synthetic polymer is preferably selected from polyacrylonitrile-based polymers, polymethylmethacrylate-based polymers, polyamide-based polymers, polysulfone-based polymers, and ethylene-vinyl alcohol copolymers. Of these, polysulfone-based polymers are most preferable due to the excellent strength, superior resistance to sterilization treatment, and controllability in the pore diameter and structure during membrane preparation.

The term "-based polymer" in the present invention refers to a synthetic polymer containing that polymer as a main component. For example, a polyacrylonitrile-based polymer in the present invention refers to a synthetic polymer containing polyacrylonitrile as a main component.

In addition to the main component, the synthetic polymer may contain monomers having any optional functional group such as an anionic group, for example. In addition, a part of the polymer may be chemically modified to introduce a functional group such as an anionic group.

Since such a synthetic polymer is a main component for forming the membrane, it is possible to use other components in combination such as a hydrophilic polymer for providing hydrophilic properties or a pore forming agent.

In the present invention, a liquid loaded to the membrane is a liquid containing a plurality of solutes and/or dispersoids. A typical example is blood that contains various solutes with a low to high molecular weight as well as blood cells as dispersoids. Blood includes not only whole blood but also blood from which components such as plasma and erythrocytes have been separated. Therefore, typical examples of the asymmetric porous membrane of the present invention are membranes usable for the purposes such as hemodialysis, hemofiltration, and plasma separation.

The asymmetric porous membrane mainly formed from a synthetic polymer of the present invention preferably has a cross-section structure having a dense layer on the side on which a liquid to be processed is loaded and a supporting layer with a porous structure formed inside with a pore diameter larger than the pore diameter of the dense layer, wherein the average pore diameter increases toward the side opposite to the side on which a liquid to be processed is loaded. The membrane may be either a flat membrane or a hollow fiber membrane with no specific limitations to the configuration inasmuch as this structure can be maintained.

When the dense layer is thin, albumin that is a useful protein in blood easily permeates through the membrane, whereas when the dense layer is thick, the permeation resistance increases, giving rise to a decrease in the total permeation amount. Therefore, the thickness of the dense layer is preferably about 1-20 µm, and more preferably 2-10 µm. The average pore diameter of the dense layer should be determined to ensure an increase in the permeability of low molecular weight plasma proteins and AGE that cause dialysis amyloidosis and a decrease in the amount of leaking plasma albumin. Another important factor in determining the pore diameter is to avoid contact of the supporting layer having negative charges with the coagulation factor XII, high molecular weight kininogen, and prekallikrein. Therefore, the cut off molecular weight of the dense layer is preferably about 10-100 kD, and more preferably 30-100 kD. The cut off molecular weight herein refers to the average molecular weight of dextran molecule of which the rate of blocking is 90%.

The above dense layer must be substantially free from electric charges at least on the outermost surface. The dense layer may be free from electric charges either in its entirety or only on the outermost surface. The term "substantially free from electric charges" herein refers to the state of the layer having an electric charge of the $\zeta$ potential at pH 7.4 of −2 mV to 30 mV determined according to the $\zeta$ potential measurement of Examples. The term "outermost surface" herein does not refer to a dense layer or the like that can be macroscopically identified by a cross-sectional photograph of membrane, but refers to a thin layer that can be analyzed by a surface analysis means such as X-ray photoelectron spectroscopy.

The asymmetric porous membrane of the present invention must contain, in addition to the dense layer functioning as a size barrier, negative charges functioning as a charge barrier at least in a part of the membrane other than the outermost surface.

With regard to the negative charge distribution, when the dense layer is not electrically charged in its entirety, the negative charges maybe present in apart of or all over the membrane excluding the dense layer, but at least a part of the negative charges must function as a charge barrier. Since the porous membrane of the present invention is an asymmetric porous membrane with a large average pore diameter on the side opposite to the side on which a liquid to be processed is loaded, if negative charges are present at least on the side on which the average pore diameter is close to that of the dense layer, that part is expected to effectively function as a main charge barrier. If the negative charges are present at a high density immediately below the dense layer, such negative charges are more preferable as a charger barrier. In the case of blood dialysis, negative charges are preferably present all over the membrane except for the dense layer to prevent a reverse flow of physiological substances having negative charges such as endotoxin.

On the other hand, when only the outermost surface of the dense layer does not have negative charges, the negative charges may be present either in a part or all over the membrane excluding the dense layer, but at least a part of the negative charges must function as a charge barrier. If negative charges are present at least in a part of the membrane other than the outermost surface of the dense layer, that part is expected to effectively function as a charge barrier. In the case of hemodialysis, negative charges are present preferably all over the membrane except for the uppermost surface of the dense layer to prevent a reverse flow of physiological substances having negative charges such as endotoxin.

FIG. 1 shows an embodiment of the asymmetric porous membrane of the present invention. As indicated in FIG. 1, in the cross-section in the liquid permeation direction, a dense layer (a) with the smallest pore size is provided on the side coming in contact with the liquid to be processed. The dense layer preferably has a thickness of several mm or less to function as a resistance to permeation. A layer (b) with negative charges is provided on the permeation side of the membrane immediately below the dense layer. The pore radius of the charged layer (b) is larger than pore radius of the dense layer (a). Although there are no specific limitations, the thickness of about 1 µm or more is sufficient for the charged layer. In this embodiment, the dense layer (a) is substantially free from electric charges in its entirety.

The negative charges of which at least a part functions as a charge barrier originate from a charged substance provided to a membrane after formation when a formed membrane does not have electric charges or from the membrane itself when the membrane inherently has negative charges.

When the negative charges originate from a charged substance provided to the membrane after formation, the membrane is prepared from an asymmetric porous membrane substantially free from electric charges as a base material by immobilizing a negatively charged polymer from the side opposite to the dense layer of the base material membrane. When the negative charges are provided to the base material membrane substantially free from electric charges in this manner, at least a part of the negative charges functions as a charge barrier in a desired area.

When the negative charges originate from charges inherently possessed by the base material membrane, it is sufficient that an outermost surface substantially free from electric charges be formed on the surface of this membrane possessing the negative charges. As examples of such a membrane, a membrane prepared by coating a synthetic polymer substantially free from electric charges on the surface of a dense layer of an asymmetric porous membrane possessing negative charges, a composite membrane prepared by forming a dense layer of coagulated synthetic polymer substantially free from electric charges on the surface of a porous membrane possessing negative charges, and the like can be given. A membrane prepared by integrating a porous substrate film possessing negative charges and a dense layer of which at least the outermost surface is substantially free from electric charges during membrane formation using a multiple slit-type spinneret may also be used. In addition, a membrane with negative charges provided on a part of the base material membrane can be obtained by changing the compositions of the synthetic polymer extruded from two or more slits. These alternatives are appropriately selected. In this manner, when the base material membrane is a porous membrane possessing negative charges, at least a part of the negative charges inherently possessed by the membrane functions as a charge barrier in a desired area of the membrane.

A substrate membrane possessing negative charges in the present invention may be a membrane formed mainly from any one of synthetic polymers previously described (page 9, lines 4-11). Typically, such a membrane is an asymmetric porous membrane having an electric charge of the ζ potential at pH 7.4 of −2 mV or less, and preferably −4 mV or less and −50 mV or more. Any appropriately prepared membranes or commercially available asymmetric porous membranes can be used irrespective of the type of polymer or composition inasmuch as the above zeta potential requirement is satisfied.

The above-mentioned synthetic polymers possessing negative charges are the polymers that can produce the substrate membrane exhibiting the above zeta potential.

The substrate membrane substantially free from electric charges in the present invention may be formed mainly from any synthetic polymer described above (page 14, lines 20-25) and refers to an asymmetric porous membrane having an electric charge of the ξ potential at pH 7.4 of more than −2 mV, and preferably more than −2 mV and less than +30 mV. Any appropriately prepared membranes or commercially available asymmetric porous membranes can be used irrespective of the type of polymer or composition inasmuch as the above zeta potential requirement is satisfied.

The above-mentioned synthetic polymers substantially free from electric charges are the polymers that can produce the substrate membrane exhibiting the above zeta potential.

If the asymmetric porous membrane having such negative charges is used, the negative charges function as a charge barrier in the area other than the outermost surface having no charges to electrostatically repulse human serum albumin and suppress permeability of plasma albumin, whereby the amount of plasma albumin leaked can be reduced.

The term "mainly formed from a synthetic polymer" herein indicates that 50% or more of the components forming the asymmetric porous membrane is a specific polymer. For example, in the case of a polysulfone-based polymer, 50 wt % or more, and preferably 60% or more of the components forming the asymmetric porous membrane should be the polysulfone-based polymer.

The present invention will be hereinafter described on an embodiment in which the negative charges are originated from electric charges inherently possessed by the substrate membrane and the synthetic polymer is a polysulfone-based polymer. However, the present invention should not be limited to this embodiment.

The term "polysulfone-based polymer" in the present invention refers to all polymers having a sulfone bond and includes both sulfonated polymers and non-sulfonated polymers. Copolymers with a hydrophilic polymer are also included. Here, the hydrophilic polymer includes a linear or branched alkylene oxide-based polymer represented by polyethylene oxide, polyvinyl pyrrolidone, polyethylene glycol, and the like.

The polysulfone-based polymers are broadly classified into aromatic polysulfone-based polymers and aliphatic polysulfone-based polymers. The term "aromatic polysulfone-based polymer" in the present invention indicates non-sulfonated aromatic polysulfone-based polymers distinguished from sulfonated aromatic polysulfone-based polymers. In the same manner, the term "aliphatic polysulfone-based polymer" in the present invention indicates non-sulfonated aliphatic polysulfone-based polymers distinguished from sulfonated aliphatic polysulfone-based polymers.

As specific examples of the aromatic polysulfone-based polymer used in the present invention, aromatic polysulfone-based polymers containing a recurring unit of the following chemical formula (1), chemical formula (2), chemical formula (3), chemical formula (4), or chemical formula (5) can be given. Of these, the aromatic polysulfone-based polymers containing the recurring unit of the chemical formula (1), chemical formula (2), or chemical formula (3), easily industrially available, are preferable.

Chemical Formula (1):
Chemical Formula (2):
Chemical Formula (3):
Chemical Formula (4):
Chemical Formula (5):

Although there are no specific limitations to the degree of polymerization indicated by the symbol n in the above formulas, the weight average molecular weight of the polymer is preferably in the range of 1,000-1,000,000, and more preferably 5,000-100,000.

As specific examples of the aliphatic polysulfone-based polymer used in the present invention, polymers containing the recurring unit shown by the following chemical formula (6) can be given.

Chemical Formula (6):

Although there are no specific limitations to the degrees of polymerization indicated by the symbols m and l in the above chemical formula (6), the weight average molecular weight of the polymer is preferably in the range of 6,000-600,000, and more preferably 10,000-200,000.

In the present invention, the polysulfone-based polymer may be used as a copolymer with a hydrophilic polymer. As example of the copolymer of a non-sulfonated polysulfone-based polymer and a hydrophilic polymer used in the present invention, copolymers of a hydrophilic polymer and an aromatic polysulfone-based polymer, specifically block or graft copolymers of a linear or branched polyalkylene oxide-based polymer represented by polyethylene oxide, polyvinyl pyrrolidone, polyethylene glycol, or the like and the above aromatic polysulfone-based polymer can be given. Of these, block or graft copolymers of a linear or branched polyalkylene oxide-based polymer represented by polyethylene oxide and the above aromatic polysulfone-based polymer are preferable.

The copolymer of a non-sulfonated polysulfone-based polymer and a hydrophilic polymer used in the present invention includes, in addition to the above block or graft copolymers of a hydrophilic polymer and an aromatic polysulfone-based polymer, random copolymers of the recurring units in the hydrophilic polymer and the recurring units in the aromatic polysulfone-based polymer. Of these, the block or graft copolymers of a hydrophilic polymer and an aromatic polysulfone-based polymer are more preferable.

In the present invention, the polysulfone-based polymer preferably comprises at least one polymer selected from the sulfonated polysulfone-based polymers and aliphatic polysulfone-based polymers.

The sulfonated polysulfone-based polymer generally refers to a sulfonated polymer having a sulfone bond and includes, but is not limited to, sulfonated aromatic polysulfone-based polymers, sulfonated aliphatic polysulfone-based polymers, and copolymers of these sulfonated polymers with a hydrophilic polymer.

As specific examples of these sulfonated aromatic polysulfone-based polymers and sulfonated aliphatic polysulfone-based polymers, sulfonated compounds of the above-mentioned specific polysulfone-based polymers are given and can be preferably used.

As examples of the copolymer with a hydrophilic polymer, copolymers of a hydrophilic polymer and a sulfonated product of aromatic polysulfone-based polymer, specifically, block or graft copolymers of a linear or branched polyalkylene oxide-based polymer represented by polyethylene oxide, polyvinyl pyrrolidone, polyethylene glycol, or the like and a sulfonated product of the above aromatic polysulfone-based polymer can be given. Of these, block or graft copolymers of a linear or branched polyalkylene oxide-based polymer represented by polyethylene oxide and a sulfonated product of aromatic polysulfone-based polymer are preferable.

The aromatic polysulfone-based polymer or aliphatic polysulfone-based polymer can be sulfonated using a known method. One example of such a method, in the case of sulfonation of an aromatic polysulfone-based polymer, comprises reacting a solution of an aromatic polysulfone-based polymer in methylene chloride with a solution of chlorosulfonic acid in methylene chloride while stirring in a reaction vessel to produce a polymer, precipitating the resulting polymer in isopropanol, and washing and drying the precipitate to obtain a polymer powder. However, the process for sulfonation is not limited to this method.

The method for synthesizing the copolymer of a hydrophilic polymer and a sulfonated product of aromatic polysulfone-based polymer includes, but is not limited to, (a) a method of sulfonating a copolymer of an aromatic polysulfone-based polymer and a hydrophilic polymer, (b) a method of sulfonating an aromatic polysulfone-based polymer and copolymerizing the resulting sulfonated polymer with a hydrophilic polymer, and (c) a method of sulfonating raw material monomers for an aromatic polysulfone-based polymer, synthesizing a sulfonated aromatic polysulfone-based polymer, and copolymerizing the sulfonated aromatic polysulfone-based polymer with a hydrophilic polymer.

When the sulfonated polysulfone-based polymer thus obtained by sulfonation is a sulfonated aromatic polysulfone-based polymer with a replacement degree of one or more, the hydrophilic properties due to sulfonation are so strong that the resulting polymer tends to become water-soluble and is difficult to use.

When the replacement degree is from 0.5 or more to less than 1.0, the sulfonated aromatic polysulfone-based polymer is swellable with water and cannot be used alone. Such a polymer must be used mixed with an aromatic polysulfone-based polymer which is a non-sulfonated polysulfone-based polymer. In this case, the ratio by weight of the sulfonated aromatic polysulfone-based polymer to the aromatic polysulfone-based polymer in the dope solution is preferably 0.02-0.75, and more preferably 0.05-0.5.

When the replacement degree is from 0.05 or more to less than 0.5, the sulfonated aromatic polysulfone-based polymer may be used either alone or mixed with an aromatic polysulfone-based polymer. When used as a mixture, the ratio by weight of the sulfonated aromatic polysulfone-based polymer to the aromatic polysulfone-based polymer in the dope is preferably 0.1-1, and more preferably 0.1-0.9. It is possible to have a desired amount of negative charges (sulfonation density) in the whole membrane by changing the replacement degree and the mixing ratio. The static repulsion due to negative charges can thus be adjusted. If the replacement degree is less than 0.05, the amount of negative charges by sulfonation is too low to cause the membrane to exhibit sufficient cutt off performance even if the sulfonated aromatic polysulfone-based polymer is used alone.

On the other hand, when the replacement degree is less than 0.3, since hydrophilicity is insufficient the case where the sulfonated aromatic polysulfone-based polymer is used alone or mixed with an aromatic polysulfone-based polymer, a hydrophilic polymer must be used in combination to increase the hydrophilicity. Here, as the hydrophilic polymer to be used in combination, a linear or branched alkylene oxide-based polymer represented by polyethylene oxide, polyvinyl pyrrolidone, polyethylene oxide, or the like, and a copolymer of the hydrophilic polymer and an aromatic polysulfone-based polymer can be given.

Using a hydrophilic polymer in combination to increase hydrophilicity irrespective of the replacement degree is a preferable embodiment of the asymmetric porous membrane of the present invention. The amount of the hydrophilic polymer in the dope solution is preferably 0.5-20 wt %, and more preferably 1-10 wt %. The replacement degree (degree of sulfonation or DS) herein refers to the number of sulfonic acid groups present per recurring unit of the polysulfone skeleton.

Among the polysulfone-based polymers, aliphatic polysulfone-based polymers have strong negative charges without being sulfonated. For example, the aliphatic polysulfone-based polymer comprising the recurring unit of the chemical formula (6) may be sulfonated by the above-described known method, but can be used in place of the sulfonated polysulfone-based polymer without being sulfonated.

The sulfonated aliphatic polysulfone-based polymers and the aliphatic polysulfone-based polymers may be used either individually or in combination with an aromatic polysulfone-based polymer. When used in combination, the ratio by weight of the sulfonated aliphatic polysulfone-based polymer or the aliphatic polysulfone-based polymer to the aromatic polysulfone-based polymer in the dope solution is preferably 0.1 to 0.9, and more preferably 0.15 to 0.8, depending on the negative charges possessed by the sulfonated aliphatic polysulfone-based polymer and the aliphatic polysulfone-based polymer.

Using a hydrophilic polymer in combination to increase hydrophilicity is a preferable embodiment. The amount of the hydrophilic polymer in the dope solution is preferably 0.5-20 wt %, and more preferably 1-10 wt %.

The sulfonated aromatic polysulfone-based polymers, sulfonated aliphatic polysulfone-based polymers, and aliphatic polysulfone-based polymers can be used in combination as components to form the asymmetric porous membrane possessing negative charges of the present invention.

A dense layer free from electric charges is present at least on the outermost surface on the liquid loading side of the asymmetric porous membrane of the present invention. That outermost surface preferably comprises a non-charged hydrophilic material. Specifically, when the dense layer is free from electric charges in its entirety, either the dense layer may be formed from the non-charged hydrophilic material or the outermost surface substantially free from electric charges may comprise the non-charged hydrophilic material. When only the outermost surface of the dense layer does not have electric charges, this outermost surface is preferably formed from the non-charged hydrophilic material.

In the present invention, the non-charged hydrophilic material refers to a hydrophilic material substantially free from electric charges. When a material is substantially free from electric charges, that material has an electric charge of the ζ potential at pH 7.4 of more than −2 mV and less than +30 mV determined according to the ζ potential measurement described in Examples.

Specifically, even if a material possesses negative charges, such a material is included in the non-charged hydrophilic material of the present invention, inasmuch as an anaphylactoid reaction such as a slight fever and anesthesia of fingers and lips, induced by bradykinin (BKN) produced by contact with blood, does not occur during a hemodialysis treatment, specifically, inasmuch as the degree of negative charges in terms of the ζ potential at pH 7.4 determined according to the ζ potential measurement is more than −2 mV.

The non-charged hydrophilic material will now be explained in more detail taking the case where a polysulfone-based polymer is used as the synthetic polymer as an example. However, the present invention is not limited to this example.

The hydrophilic material refers to a synthetic or naturally occurring polymer or a derivative thereof exhibiting affinity with water molecule via a hydrogen bond-type functional group such as a hydroxyl group, acrylamide group, or ether group or an electrolytically dissociating functional group such as a carboxyl group, sulfonic acid group, or quaternary amino group. Examples include naturally occurring polymers and oligomers such as starch, pectin, gelatin, casein, and dextran; semisynthetic polymers and oligomers such as methyl cellulose, carboxymethyl cellulose, and hydroxyethyl cellulose; linear or branched polyalkylene oxides such as polyethylene oxide; polyethylene glycol, polyvinyl alcohol, polyvinyl methyl ether, polyvinyl pyrrolidone, sodium polyacrylate, polyethyleneimine, and polyacrylamide; a mixture of at least one of these polymers and oligomers and an aromatic polysulfone-based polymer; and a copolymer of at least one of these polymers and oligomers and an aromatic polysulfone-based polymer.

Of these, hydrophilic polymers such as linear or branched polyalkylene oxides, polyethylene glycol, and polyvinyl pyrrolidone, a mixture of the hydrophilic polymer and aromatic polysulfone-based polymer, and a copolymer of the hydrophilic polymer and aromatic polysulfone-based polymer are preferable, with more preferable hydrophilic materials being linear or branched alkylene oxide-based polymers, a mixture of the alkylene oxide-based polymer and aromatic polysulfone-based polymer, a copolymer of the alkylene oxide-based polymer and aromatic polysulfone-based polymer, polyvinyl pyrrolidone, a mixture of polyvinyl pyrrolidone and aromatic polysulfone-based polymer, and a copolymer of polyvinyl pyrrolidone and aromatic polysulfone-based polymer. Particularly preferable hydrophilic materials are polyethylene oxide, polyvinyl pyrrolidone, mixtures of these polymers and aromatic polysulfone-based polymer, and copolymers of these polymers and aromatic polysulfone-based polymer.

In the present invention, the polyalkylene oxide used as a non-charged hydrophilic material or a component for the copolymer with the polysulfone-based polymer is not limited to a linear polyalkylene oxide, but a branched polyalkylene oxide may also be used. The polyalkylene oxides can provide the substrate membrane with superior biocompatibility due to their capability of forming a diffusive layer on the membrane surface and can significantly suppress contact of proteins such as high molecular weight kininogen with the substrate membrane. The method for manufacturing aromatic polysulfone copolymers having the branched polyalkylene oxide is disclosed in U.S. Pat. No. 6,172,180, for example.

The linear or branched alkylene oxide-based polymer, mixture of the alkylene oxide-based polymer and aromatic polysulfone-based polymer, the copolymer of the alkylene oxide-based polymer and aromatic polysulfone-based polymer, polyvinyl pyrrolidone, mixture of polyvinyl pyrrolidone and aromatic polysulfone-based polymer, and copolymer of polyvinyl pyrrolidone and aromatic polysulfone-based polymer, particularly polyethylene oxide, polyvinyl pyrrolidone, mixtures of the polyethylene oxide or polyvinyl pyrrolidone and aromatic polysulfone-based polymer, and copolymers of the polyethylene oxide or polyvinyl pyrrolidone and aromatic polysulfone-based polymer can exhibit extremely low activation of platelet, endogenous coagulation system, complementary system, and kuinine system when brought into contact with blood, possess excellent biocompatibility, and permit adhesion of only a very small amount of plasma proteins. These materials can thus suppress changes in permeability over time as a blood processing membrane during dialysis, for example.

These non-charged hydrophilic materials are dissolved at a mixing ratio in a wide range not only in good solvents for polysulfone-based polymers forming the porous membrane as the substrate membrane, but also in mixed solvents consisting of the good solvent and nonsolvents for the polysulfone-based polymers. Therefore, it is possible to form a surface layer of these non-charged hydrophilic materials on the blood contact side of the substrate membrane by dissolving them in the mixed solvent when preparing the substrate membrane or by applying the solution to the substrate membrane after preparation.

The presence or absence of a layer substantially free from electric charges on the outermost surface of the dense layer can be evaluated in the present invention by appropriately selecting a surface analysis method such as X-ray photoelectron spectroscopy according to the type of synthetic polymer forming the substrate membrane and the type of charged polymer. For example, when the synthetic polymer is a polysulfone-based polymer, the presence or absence of a layer containing a non-charged hydrophilic material as the layer substantially free from electric charges on the outermost surface of the dense layer can be evaluated as follows.

A ratio of oxygen atoms to sulfur atoms ([O]/[S]) or a ratio of nitrogen atoms to sulfur atoms ([N]/[S]) is determined by X-ray photoelectron spectroscopy (hereinafter referred to as "XPS") as a surface concentration index of the non-charged hydrophilic material. Here, either [O]/[S] or [N]/[S] is selected according to the type of the non-charged hydrophilic material. When the polymer contains polyvinyl pyrrolidone, for example, a value of [N]/[S] is used. When the polymer contains polyalkylene oxide, a value of [O]/[S] is used. When the polymer contains both polyvinyl pyrrolidone and polyalkylene oxide, either one of the values [N]/[S] and [O]/[S] is used.

Possessing a layer containing a non-charged hydrophilic material in the present invention indicates that, when the surface concentration index of the non-charged hydrophilic material is [O]/[S], an inequality [O]/[S]>6, or preferably [O]/[S]>7 is satisfied; and when the surface concentration index of the non-charged hydrophilic material is [N]/[S], an inequality [N]/[S]>1.5, or preferably [N]/[S]>2.0 is satisfied. When the polymer contains both polyvinyl pyrrolidone and polyalkylene oxide, it is sufficient that either the inequality for the value [N]/[S] or [O]/[S] is satisfied.

The method for manufacturing the asymmetric porous membrane will now be described. There are broadly seven methods for manufacturing the asymmetric porous membrane of the present invention.

Specifically, they are:

(1) a method of using a porous membrane having negative charges as a substrate membrane and forming a dense layer by coagulating a synthetic polymer substantially free from electric charges on the surface of the substrate membrane, (2) a method of providing a solution containing a charged polymer with a size impermeable through the dense layer from the supporting layer side toward the dense layer side of the substrate membrane of an asymmetric porous membrane substantially free from electric charges, thereby immobilizing the charged polymer substance in the membrane.

(3) a method of extruding a dope solution containing a synthetic polymer having negative charges from an outer cylinder of a double cylindical spinneret, extruding a solution of a synthetic polymer substantially free from electric charges in a mixed solvent containing a nonsolvent and a good solvent from the inner cylinder of the double cylindical spinneret, and coagulating the synthetic polymer to form a membrane, (4) a method of injecting the dope solution from an outer cylinder a triple cylindical spinneret, injecting a solution containing a synthetic polymer substantially free from electric charges from a middle cylinder of the triple cylinder spinneret nozzle, and injecting a solvent exhibiting an action of coagulating the synthetic polymer substantially free from electric charges from an inner cylinder of the triple cylinder spinneret nozzle to form a membrane, (5) a method of extruding the dope solution from the outer cylinder of a double cylindical spinneret, extrudung a mixture of a nonsolvent and good solvent from the inner cylinder, coagulating the synthetic polymer to form a porous membrane, and causing the dense layer contact surface of the resulting hollow membrane to come in contact with a solution containing a synthetic polymer substantially free from electric charges, thereby forming a membrane, (6) a method of using an asymmetric porous membrane substantially free from electric charges as a substrate membrane, separately forming a dense layer by coagulating a synthetic polymer having negative charges on the surface of the substrate membrane, and causing a solution of a synthetic polymer substantially free from electric charges to come in contact with the surface of the dense layer, and (7) a method of extruding the dope solution from a middle cylinder of a triple cylindrical spinneret, extruding a solution containing a synthetic polymer substantially free from electric charges from an outer cylinder of the triple cylindical spinneret, and extruding a solvent exhibiting an action of coagulating the synthetic polymer substantially free from electric charges from an inner cylinder of the triple cylindical spinneret to form a dense layer containing negative charges, and causing a solution of a synthetic polymer substantially free from electric charges to come in contact with the surface of the dense layer, thereby forming a membrane.

Among the above methods, the methods (1) and (2) are preferably applied to the case where the dense layer does not have electric charges all over that layer. The methods (3) to (7) are preferably applied to the case where the outermost surface of the dense layer does not have electric charges.

The method (1) comprises providing a porous membrane having negative charges but not a desired dense layer and separately forming a dense layer by coagulating a synthetic polymer substantially free from electric charges on the surface of the porous membrane.

The substrate membrane may be formed mainly from any synthetic polymer described above (page 9, lines 4-17). Typically, such a membrane is a porous membrane having a $\zeta$ potential at pH 7.4 of −2 mV or less, and preferably −4 mV or less and −50 mV or more. Any appropriately prepared membranes or commercially available porous membranes can be used irrespective of the type of polymer or composition inasmuch as the above zeta potential requirement is satisfied.

A known composite membrane manufacturing method can be applied to formation of the dense layer. Specifically, a solution of the synthetic polymer forming the dense layer in a good solvent for the synthetic polymer but not dissolving the substrate membrane is used. After causing the solution to come in contact with the surface of the substrate membrane, that surface is then caused to come in contact with a coagulating fluid that is a nonsolvent for the synthetic polymer forming the dense layer and does not dissolve the substrate membrane, or the solvent is removed by drying to cause the polymer to deposit, whereby a composite membrane can be obtained.

The dense layer provided on the surface of the substrate membrane may be formed from any one of the synthetic polymers previously described (page 9, lines 4-17). A synthetic polymer substantially free from electric charges is used. Any type of polymer and composition can be used without specific limitations inasmuch as the above definition can be satisfied. In addition, a non-charged hydrophilic material may be applied to the outermost surface of the formed dense layer or the dense layer itself may be formed from the non-charged hydrophilic material.

To form a charged layer immediately below the dense layer in the asymmetric porous membrane in the method (2), a solution of a charged material is supplied by filtration or diffusion from the supporting layer side of the membrane to the dense layer side. If a charged substance with a size that cannot permeate through the dense layer is used, the charged substance permeating through the supporting layer of the membrane toward the dense layer is blocked by the dense layer and captured by the porous supporting layer immediately below the dense layer. The captured charged substance is then immobilized.

To immobilize the charged substance, a solution containing a crosslinking agent (immobilizing agent) that can cause a crosslinking reaction among molecules of the charged substance or between the molecules of the charged substance and molecules of the membrane material is supplied by permeation or diffusion from the supporting layer side of the membrane to cause local crosslinking reactions, thereby physically or chemically immobilizing the charged substance immediately below the dense layer of the membrane. Although the crosslinking is a preferable method, any other method that can immobilize the charged substance in the membrane can be used.

Alternatively, the crosslinking agent (immobilizing agent) may be supplied by diffusion from the dense layer side, while supplying the charged substance by filtration or diffusion from the supporting layer side of the membrane, to immobilize the charged substance immediately below the dense layer.

In the step of coagulating the asymmetric membrane, it is possible to react the coagulating agent that is present outside the membrane directly with the polymer solution using a chemical compound that can introduce charged functional groups. Distribution of charges in the cross-section direction of the membrane can be polarized so that charges may be present outside the membrane, but do not occur in the dense layer. A charged membrane in which charges do not expose inside can be obtained in this manner.

Although the substrate membrane in this method may be formed from any one of the synthetic polymers previously described (page 9, lines 4-11), this membrane is an asymmetric porous membrane substantially free from electric charges. A membrane substantially free from electric charges refers to the membrane having an electric charge of $\zeta$ potential at pH 7.4 of more than −2 mV and less than +30 mV determined according to the $\zeta$ potential measurement described in the Examples. Any appropriately prepared membranes or commercially available asymmetric porous membranes can be used irrespective of the type of polymer or composition inasmuch as the above zeta potential requirement is satisfied.

Although the charged polymer having negative charges provided to the substrate membrane may be any naturally occurring or synthetic charged polymers, polymers having a sulfonic acid groups are particularly preferable due to a large degree of electrolytic dissociation under physiological pHs. Specifically, any sulfated polysaccharides represented by acidic mucopolysaccharides such as heparin, heparan sulfate, chondroitin sulfate, and kerato sulfate, and semi-synthetic polysaccharides such as dextran sulfate can be used. The synthetic polymer that can be used includes copolymers produced from vinyl-type monomers containing sulfonic acid groups such as sodium methallylsulfonate. Water-soluble polymers are preferable for the purpose of not damaging the substrate membrane during processing. These polymers are particularly preferable due to their chemical structure that enables the polymers to crosslink by themselves by processing with a crosslinking reagent or by irradiation or to be immobilized by reacting with part of membrane.

In addition, the charged polymers with a molecular size impermeable through a dense layer are used and caused to be present in the membrane so that the negative charges do not expose on the surface of the dense layer. Furthermore, if a charged polymer having high affinity with the substrate membrane, particularly having high adsorptivity, is used, a membrane with negative charges provided all over the substrate membrane except for the dense layer can be obtained.

It is possible to apply a non-charged hydrophilic material to the outermost surface of the dense layer also in the manufacturing method (2).

The manufacturing methods (3)-(5) will now be described taking the cases in which a polysulfone-based polymer is used as the synthetic polymer and a non-charged hydrophilic material is used as the synthetic polymer substantially free from electric charges as examples. Of course, the present invention is not limited to these examples.

As the polymer forming the dope solution used for the manufacture of the asymmetric porous membrane, which is the substrate membrane, (1) a sulfonated polysulfone-based polymer alone, (2) a mixture of a sulfonated polysulfone-based polymer and an aromatic polysulfone-based polymer, (3) an aliphatic polysulfone-based polymer alone, (4) a mixture of a aliphatic polysulfone-based polymer and aromatic polysulfone-based polymer, (5) a mixture of the polymer or polymer composition of either one of (1)-(4) and a hydrophilic polymer, and the like can be given. One of these polymers or polymer compositions is appropriately selected taking the membrane performance into consideration. The dope solution is prepared by dissolving these polymers or polymer compositions in a solvent. The solvent dissolving the polysulfone-based polymers is hereinafter referred to as a good solvent.

As the good solvent, N,N-dimethylacetamide, N,N-dimethylformamide, N-methyl-2-pyrrolidone, dimethylsulfoxide, and the like are preferably used, with N,N-dimethylformamide and N-methyl-2-pyrrolidone being particularly preferable. These good solvents are not required to be used alone, but two or more of them may be used in combination to adjust the solubility of the polymer or the viscosity of the dope solution or to control the membrane performance. In addition, it is possible to add a nonsolvent for the polysulfone-based polymers, such as water, alcohols such as isopropyl alcohol and ethanol, inorganic salts such as sodium chloride and calcium chloride, and glycols such as propylene glycol, tetraethylene glycol, and polyethylene glycol (hereinafter referred to as "nonsolvent") to accelerate pore formation that affects the membrane performance or to prevent void formation. The type and amount of the nonsolvents are appropriately selected and adjusted according to the required performance of the porous membrane.

Although the concentration of the polymer in the dope solution depends on the molecular weight of the polymer, that concentration is in the range of 10-50 wt %, and preferably 15-40 wt % from the viewpoint of drawability and membrane strength.

In the manufacturing method (3), the dope solution from the outer cylinder is used as a spinning solution. A mixture of the solvent for the dope solution used for the outer cylinder and a nonsolvent is used for the solution containing the non-charged hydrophilic material extruded from the inner cylinder. As the nonsolvent, water, isopropyl alcohol, ethanol, propylpropylene glycol, tetraethylene glycol, and the like can be given. Of these, water is preferable. The mixing ratio of the good solvent and nonsolvent is the largest factor to determine the average pore diameter of the substrate membrane. In the case of the porous membrane made mainly from a polysulfone-based polymer, an increase in the ratio of water that is a nonsolvent generally tends to decrease the average pore size of the dense layer. Therefore, the ratio of the good solvent to the nonsolvent is preferably from 10/90 to 65/35, and more preferably from 20/80 to 55/45.

In the porous membrane formed by coagulating polymer solutions simultaneously extruded from the outer cylinder and inner cylinder as in the manufacturing method (3), the surface layer formed close to the outermost surface of the dense layer of the porous membrane may peel off or elimination during post-processing and the like. However, when the polymer solutions are simultaneously extruded from the outer cylinder and the inner cylinder, polymers entangle among molecular chains in the interface of the outer cylinder solution and the inner cylinder solution while coagulating, whereby such peeling or elimination is prevented. Even if a mixed solution, in which a hydrophilic polymer such as polyalkylene oxide or polyvinyl pyrrolidone is used alone as the non-charged hydrophilic material, is used as the inner cylinder solution, peeling or elimination does not occur if the hydrophilic polymer has a weight average molecular weight of 5,000 or more, and preferably 8,000 or more. On the other hand, when the average molecular weight of the hydrophilic polymer used as the non-charged hydrophilic material is less than 5,000, a mixture of the hydrophilic polymer and an aromatic polysulfone-based polymer or a copolymer of the hydrophilic polymer and an aromatic polysulfone-based polymer is preferably used to the extent that such a polymer mixture or copolymer is dissolved in the mixed solvent used for the inner cylinder.

The concentration of the non-charged hydrophilic material that is an important factor for determining the thickness of the surface layer is about 0.01-15 wt %, and preferably 0.05-5 wt %. This range of concentration ensures not only the thickness of the surface layer sufficiently large to suppress influence of negative charges on the substrate membrane, but also formation of a thin layer with a uniform thickness. In addition, the above concentration range ensures a low viscosity of the solution that can accelerate difussion of polymer to the outer cylinder solution side, enabling the polymer solution to uniformly cover the pore surface without changing the pore size near the surface of the substrate membrane.

The hollow fiber membrane can be manufactured using a triple cylindrical spinneret as in the manufacturing method (4). In the manufacturing method (4), an asymmetric porous membrane is manufactured by extruding the dope solution from an outer cylinder of the triple cylindical spinneret, a solution containing a non-charged hydrophilic material from a middle cylinder, and a solvent exhibiting an action of coagulating the polysulfone-based polymer and the non-charged hydrophilic material from an inner cylinder.

As the solvent used for the solution of the non-charged hydrophilic material extruded from the middle cylinder, N,N-dimethylacetamide, N,N-dimethylformamide, N-methyl-2-pyrrolidone, dimethylsulfoxide, and the like are preferably used, with N,N-dimethylformamide and N-methyl-2-pyrrolidone being particularly preferable. These solvents are not required to be used alone, but two or more of them may be used in combination to adjust the solubility of the polymer in the solution or the viscosity of the solution or to control the membrane performance. In addition, it is possible to add a nonsolvent including water, alcohols such as isopropyl alcohol and ethanol, inorganic salts such as sodium chloride and calcium chloride, and glycols such as propylene glycol, tetraethylene glycol, and polyethylene glycol to accelerate the pore formation that affects the membrane performance or to prevent the void formation. The type and amount of the nonsolvents are appropriately selected and adjusted according to the required performance of the porous membrane.

A mixture of a good solvent and a nonsolvent is extruded from the inner cylinder. As the good solvent, N,N-dimethylacetamide, N,N-dimethylformamide, N-methyl-2-pyrrolidone, dimethylsulfoxide, and the like are preferably used, with N,N-dimethylformamide and N-methyl-2-pyrrolidone being particularly preferable. These solvents are not required to be used alone, but two or more of them may be used in combination. As the nonsolvent, water, isopropyl alcohol, ethanol, propylpropylene glycol, tetraethylene glycol, and the like can be given. Of these, water is most preferable. The mixing ratio of the good solvent and nonsolvent is the largest factor to determine the average pore diameter of the substrate membrane. In the case of the porous membrane made mainly from a polysulfone-based polymer, an increase in the ratio of water that is a nonsolvent generally tends to decrease the average pore size of the dense layer. Therefore, the ratio of the solvent to the nonsolvent is preferably from 10/90 to 65/35, and more preferably from 20/80 to 55/45.

Hollow membranes spun by the method (3) or (4) are coagulated in a coagulating bath, washed, and dried to obtain the asymmetric porous membrane of the present invention. A post-processing using high temperature vapor or the like is effective to increase hydrophilicity of the outermost surface of the dense layer. Water that is a nonsolvent is preferably used for the coagulating bath. The water may contain a solvent such as N,N-dimethylacetamide, N,N-dimethylformamide, N-methyl-2-pyrrolidone, or polyvinylpyrrolidone. These solvents are not required to be used alone, but two or more of them may be used in combination to adjust polymer coagulating performance or to control membrane performance. A nonsolvent such as an alcohol, for example, isopropyl alcohol or ethanol, may be added. The type and amount of the nonsolvents are appropriately selected and adjusted according to the required performance of the porous membrane. The temperature of the coagulating bath is important since the coagulating bath temperature significantly affects the membrane performance. The temperature is preferably in the range of 20-90° C., and more preferably 50-70° C.

The substrate membrane used in the method (5) can be prepared using a method almost the same as in the methods (3) and (4). In this case, the same solvent composition of a good solvent and a nonsolvent as described in the manufacturing method (4) as the mixed solvent used for the inner cylinder of the triple cylindical spinneret can be applied to the solvent used as the inner cylinder solvent during spinning. A porous membrane as a substrate membrane is formed. After drying, the dense layer surface of the porous membrane is caused to come in contact with a solution containing a non-charged hydrophilic material to form the surface layer.

The solution containing a non-charged hydrophilic material has a ratio of the solvent to the nonsolvent preferably from 5/95 to 65/35, and more preferably from 20/80 to 55/45. The concentration of the non-charged hydrophilic material is 0.1-15 wt %, and preferably 0.05-5 wt %. There are no specific limitations to the method for causing the dense layer surface of the porous membrane to come in contact with the solution containing a non-charged hydrophilic material. In a typical method, after preparing a hollow fiber module by a known method, a solution containing the non-charged hydrophilic material is fed to the dense layer surface side of the module, then the solution is replaced with water until dissolution does not occur any more, thereby coagulating and immobilizing the non-charged hydrophilic material, and the coagulated non-charged hydrophilic material is dried, as required. In this case, the surface is preferably maintained to be in contact with the solution for a period of time long enough to cause the surface of the substrate membrane to become swelled or the temperature is maintained higher than room temperature, preferably at about 50-70° C., to prevent peeling or elimination of the surface layer.

EXAMPLES

The present invention will be described in more detail by examples, which should not be construed as limiting the present invention.

Evaluation Methods (Measurement of Replacement Degree)

The mol number of sulfonic acid groups is determined by the neutralization titration method described in the Analytical Chemistry Manual (1971 second edition, edited by The Japan Society for Analytical Chemistry, p 367, 2-47-3 Quantitative Analysis). The weight percentage of polysulfone skeleton is determined from the integral values of the aromatic part and the methylene chain part of polyethylene oxide in NMR. The value is converted into a value per recurring unit of polysulfone skeleton. The number of sulfonic acid groups, that is the replacement degree (degree of sulfonation or DS), is then determined from the resulting value and the previously determined amount of sulfonic acid groups.

(Method of Measuring Weight Average Molecular Weight)

The molecular weight was measured by a measuring instrument (System-21, manufactured by Shodex Co.) linked to GPC columns (KD-806M, KD-803, KD-802 manufactured by Showdex Co.) using dimethylacetamide (DMAc) as a developing solution at a column temperature of 50° C. at a flow rate of 1 ml/min. A converted molecular weight was calculated using a polystyrene standard sample (TSK standard polystyrene, manufactured by Tosoh Corp.).

(Method of Measuring Cut Off Molecular Weight)

The internal diameter of a hollow fiber membrane was measured. The number of hollow fibers to obtain constant performance was counted using the following formula. A module with an effective length of 18 cm was prepared by bonding both ends using epoxy adhesive. Before the test, the hollow fibers were thoroughly washed with a physiological saline solution for injection (Otsuka Normal Saline, manufactured by Otsuka Pharmaceutical Co., Ltd.).

Number of threads=Flow rate/$(\pi/4) \times$(internal diameter/10,000)$^2 \times$linear velocity$\times$60 min)

wherein the linear velocity is 1 cm/sec and the flow rate is 2.0 ml/min.

Next, 10 g of dextran 40,000 (manufactured by Sigma Corp., Mw=41,272) and 10 g of dextran 70,000 (manufactured by Sigma Corp., Mw=71,000) were dissolved in a physiological saline solution for injection (Otsuka Normal Saline, manufactured by Otsuka Pharmaceutical Co., Ltd.). The dextran solutions were heated to 37° C. and caused to pass through the module at a flow rate of 2.0 ml/min. When the dextran solution flowed out of the outlet of the module, a pressure was applied to make transmembrane pressure (TMP) 25 mmHg. After 10 minutes, the filtrate was collected for five minutes and was used as the sample for evaluation. Ultrafiltration rate (UFR, ml/mmHg·m$^2$·hr) was calculated from the amount of the obtained filtrate. The evaluation sample and the dextran solution used for performance test were analyzed by HPLC under the following conditions. Column: (Analytical column) Shodex GF-710HQ, (Guard column) GF-1G-7B, column temperature: 40° C., detector: RI (Shimadzu RID-6A), mobile phase: physiological saline solution, flow rate: 0.3 ml/min, six standard dextrans (Mw=186,000, 100,000, 48,000, 23,700, 12,200, and 5,800) were used to prepare a molecular weight calibration curve and convert the holding time of chromatogram into the dextran molecular weight. A peak strength in the chromatogram for each evaluation sample was divided by the peak strength in the chromatogram for dextran solution to determine a sieve coefficient (SC). The block rate is defined as (1-SC)$\times$100.

(Method of Measuring $\zeta$ Potential of Porous Membrane)

The $\zeta$ potential was measured using an electrokinetic analyzer (EKA) manufactured by Anton Paar GmbH as follows. The EKA pump was set to a voltage of 20V. A measuring sample was placed in the center of cylindrical cell in a width of 3-5 cm by sandwiching between Ag/AgCl electrodes so that a pressure of −930 to −950 mba is applied. 500 ml of a 0.001 mol/l KCl aqueous solution at 25° C. was prepared from a 0.01 mol/l KCl solution for testing (manufactured by Kishida Chemical Co.) and distilled water (manufactured by Otsuka Pharmaceutical Co., Ltd.). After filling the entire measuring circuit with the KCl solution, a 0.1 mol/l KOH solution (for volumetric analysis, manufactured by Wako Pure Chemical Industries, Ltd.) was added to adjust the pH to 11. Then, the $\zeta$ potential of the hollow fiber membrane was measured each time the pH changes by 0.8 in the range of pH 11-3, while titrating the 0.1 mol/l HCl solution (for volumetric analysis, manufactured by Wako Pure Chemical Industries, Ltd.) using RTU (Remote Controlled Titration Unit (manufactured by Anton Paar GmbH)).

(Method of Measuring XPS)

Hollow fiber membranes were cut and opened to expose the innerside. Several hollow fiber membranes cut in this manner were aligned within a measurable eyesight to measure XPS using an XPS apparatus (PHI-5400 manufactured by Physical Electronics Inc.) under the following conditions.

Excitation source: MgK$\alpha$ (15 kV/26.7 mA), analysis area: 3.5 mm$\times$1 mm, intake region: Survey Scan (for qualitative analysis) 1,100-0 eV, Narrow Scan (for quantitative analysis and chemical analysis) C1s, O1s, S2p, Pass Energy: Survey Scan: 178.9 eV and Narrow Scan: 35.75 eV. The element concentration was calculated from the area strength of the obtained Narrow Scan spectrum using a library relative sensitivity coefficient of the apparatus. The XPS was calculated using the resulting element concentration. The relative sensitivity coefficient used was C1s: 0.296, O1s: 0.711, S2p: 0.666, and N1s: 0.477.

(Test Method for Lactate Dehydrogenase (LDH) and Protein Adsorption Amount as Platelet Activation Indexes)

A minimodule made from 56 hollow fibers with an effective length of 15 cm (membrane area: 50 mm$^2$), both ends being bonded using an epoxy adhesive was washed by feeding 10 ml of a physiological saline solution (Otsuka Normal Saline, manufactured by Otsuka Pharmaceutical Co., Ltd.) both inside and outside of the hollow fibers (hereinafter referred to as "priming"). Heparinized human blood placed in a 7 ml syringe pump was charged to the module at a flow rate of 1.2 ml/min, followed by washing with 10 ml of the physiological saline solution for each of inside and outside the follow fibers. Hollow fibers were collected from the washed module, 28 for LDH determination and 23 for adsorbed protein, each with a length of 14 cm, and finely cut to be used as samples for measurement.

0.5 ml of Triton X-100/PBS solution (0.5 vol), obtained by dissolving Triton X-100 (manufactured by Nakalai Tesque, Inc.) in a phosphate buffer solution (PBS) (manufactured by Wako Pure Chemical Industries, Ltd.), was added to a spitz tube for measuring LDH. After a ultrasonic treatment for 60 minutes, 0.1 ml of the extract was reacted with 3 ml of an LDH reaction reagent (LDH monotest, manufactured by Boehringer Mannheim). Immediately after the reaction, 0.5 ml of the reactant was sampled to measure absorbance at 340 nm. The remaining reactant was reacted for a further one hour at 37° C. and the absorbance at 340 nm was measured to determine the decrease in the absorbance. The absorbance for the unreacted membrane was measured in the same manner to determine $\Delta$340 nm=(Absorbance immediately after sample reaction—Absorbance 60 minutes after sample reaction)—(Absorbance immediately after blank reaction—Absorbance 60 minutes after blank reaction). The larger the rate of decrease, the higher the LDH activity of the membrane.

2 ml of 1 vol % SDS/PBS solution obtained by dissolving sodium lauryl sulfate (SDS) (manufactured by Nakalai Tesque Inc.) in PBS was added to a bottle for measuring adsorbed protein and the mixture was stirred at room temperature for four hours. The extract was filtered through a 0.45 $\mu$m filter paper. 0.2 ml of the filtrate was used as the test solution. 3 ml of a bicinchoninic acid (BCA) protein assay reagent (manufactured by Pierce Biotechnology, Inc.) was added to the test solution. The mixture was reacted at 37° C. for 30 minutes to measure absorbance at 562 nm. Absorbance was measured in the same manner for the membrane not reacted with blood, to deduct the resulting value from the absorbance of the test solution. A calibration curve was prepared from the straight line of standard protein absorbance to determine the amount of protein absorbance of the test solution.

(Measuring Method for Bradykinin (BKN))

100 sample fibers, each with a length of 16 cm, were bonded with silicon adhesive and a polyvinylchloride cover was attached to the outer periphery (membrane area: 100 m$^2$). After priming with purified water and a physiological saline solution in that order, the sample was heated in a hot water bath at 37° C. Heparinized human fresh heparin-added blood was fed using a syringe pump to cause the blood to come in contact with the inner layer of the fibers. 5 ml of the blood at the outlet port was recovered in a test tube (containing 2 ml of an inhibitor manufactured by SRL; components: trasylol, a soybean trypsin inhibitor, protamine sulfate, and EDTA-2Na) as a sample. The blood flow rate was 0.44 ml/min to ensure a contact time of four minutes. The blood was then cooled and centrifuged to collect plasma, which was lyophilized for storing. Radioimmunoassay (RIA method) was employed for the measurement.

(Evaluation Method for Fractionation Performance Using Calf Serum)

Sieving coefficients of albumin (Mw=66,000), α1 microglobulin (α1MG and Mw=33,000), and β2 microglobulin (β2MG and Mw=11,800) as indexes for fractionation performance were determined by the following methods.

The internal diameter of a membrane was measured. The number of fibers to obtain a membrane area of 120 mm$^2$ was counted. Both ends of the fibers were bonded with an epoxy adhesive to make an effective length of 15 cm. The fibers were sufficiently washed with a physiological saline solution to prepare a mini-module for the test. Calf serum (a lyophilized product, manufactured by Valley Biomedical and Inc.) heated and melted at 37° C. was diluted with a physiological saline solution to make a total protein concentration 6.5 g/dense layer. α1 microglobulin (8 mg/l) (α1-M high grade Eiken, manufactured by Eiken Chemical Co., Ltd.) and β2 microglobulin (5 mg/l) (β2-M high grade Eiken, manufactured Eiken Chemical Co., Ltd.) were added to make a serum test sample. The serum was heated at 37° C. and filtered through the module at a flow rate of 1 ml/min. A pressure was applied to make TMP=34 mm Hg. After 60 minutes, the filtrate was collected for use as the sample for evaluation. UFR (ml/mmHg·m$^2$·hr) was calculated from the amount of the obtained filtrate. An albumin coloring reagent was added and absorbance at 630 nm was measured to identify albumin filtration. The albumin SC was calculated by dividing the absorbance of raw serum by the absorbance of sample. A full automatic immunochemical analyzer (LX-6000, manufactured by Eiken Chemical Co., Ltd.) was used for determination of SC of α1 microglobulin and β2 microglobulin.

Reference Example 1

(Preparation of Sulfonated Aromatic Polysulfone-Based Polymer)

Sodium bis(2-chlorobenzenesulfonate)-5,5'-sulfonate was synthesized according to the method described in J. Polym. Sci., Part A: Polym. Chem., 31, 853-858 (1993).

A 1,000 ml three-necked separable flask was charged with 29.02 g of bisphenol A (Tokyo Kasei Kogyo Co., Ltd.), 31.56 g of 4,4'-dichlorodiphenylsulfone (Tokyo Kasei Kogyo Co., Ltd.), 10.23 g of the above sodium bis(2-chlorobenzenesulfonate)-5,5'-sulfonate, 52.76 g of potassium carbonate (Wako Pure Chemical Industries, Ltd.), 80.8 ml of toluene (Wako Pure Chemical Industries, Ltd.), and 194.6 ml of N-methyl-2-pyrrolidone (Tokyo Kasei Kogyo Co., Ltd.). The atmosphere in the flask was replaced with nitrogen while stirring the mixture for two hours. After maintaining the mixture at 155° C., toluene was refluxed for three hours, while removing water produced by azeotropic distillation from the mixture using a deanstack trap. The mixture was heated to 190° C. After removing toluene, the mixture was maintained at 190° C. for five hours. The reaction mixture was cooled to room temperature and 10,000 ml of distilled water was slowly added dropwise while stirring to obtain a fibrous branched polysulfone-based polymer. The residue obtained by filtration was poured into 5,000 ml of distilled water. Concentrated hydrochloric acid was added to make the mixture pH 2, followed by filtration. The filtrate was washed until pH reaches 7. After washing with 6,000 ml of 40% ethanol aqueous solution at 70° C. for three hours, the mixture was filtered. The residue was washed with ethanol and dried at 50° C. under vacuum to obtain a sulfonated aromatic polysulfone-based polymer with a degree of sulfonation (DS) of 0.3. The yield was 65 g. The weight average molecular weight of the resulting polymer was 75,000.

Reference Example 2

(Preparation of Block Copolymer of Branched Polyethylene Oxide and Aromatic Polysulfone-Based Polymer)

A 1,000 ml three-necked separable flask was charged with 29.02 g of bisphenol A (Tokyo Kasei Kogyo Co., Ltd.), 43.08 g of 4,4'-dichlorodiphenylsulfone (Tokyo Kasei Kogyo Co., Ltd.), 50.00 g of potassium carbonate (Wako Pure Chemical Industries, Ltd.), 50 ml of toluene (Wako Pure Chemical Industries, Ltd.), and 130 ml of N-methyl-2-pyrrolidone (Tokyo Kasei Kogyo Co., Ltd.). The atmosphere in the flask was replaced with nitrogen while stirring the mixture. After maintaining the reaction mixture at 155° C., toluene was refluxed for three hours, while removing water produced by azeotropic distillation from the reaction mixture using a deanstack trap. The reaction mixture was heated to 190° C. After removing toluene, the mixture was maintained at 190° C. for four hours to obtain a polysulfone prepolymer with chlorine atoms bonded at both ends. A 1,000 ml three-necked separable flask was charged with 129.86 g of polyethylene glycol #4000 (Tokyo Kasei Kogyo Co., Ltd., hydroxyl value 36 mg KOH/g), 26.72 g of tetra-functional block copolymer obtained by progressive addition of propylene oxide and ethylene oxide to ethylenediamine (BASF, Tetronic 304: hydroxyl value 68 mg KOH/g), 200.00 g of potassium carbonate (Wako Pure Chemical Industries, Ltd.), 150 ml of toluene (Wako Pure Chemical Industries, Ltd.), and 350 ml of N-methyl-2-pyrrolidone (Tokyo Kasei Kogyo Co., Ltd.). The atmosphere in the flask was replaced with nitrogen while stirring the mixture. After maintaining the reaction mixture at 155° C., toluene (Wako Pure Chemical Industries, Ltd.) was refluxed for three hours, while removing water produced by azeotropic distillation from the reaction mixture using a deanstack trap. The reaction mixture was heated to 190° C. After removing toluene by evaporation, 4.91 g of 4,4'-difluorodiphenylsulfone (Tokyo Kasei Kogyo Co., Ltd.) was added. The mixture was maintained at 190° C. for six hours to obtain a branched polyethylene oxide prepolymer. The branched polyethylene oxide prepolymer was added to the reaction mixture of the above polysulfone prepolymer with chlorine atoms bonded to both ends. The mixture was maintained at 190° C. for eight hours in a nitrogen atmosphere. The reaction mixture was slowly added dropwise to 10,000 ml of distilled water while stirring to obtain fibrous branched PEO-polysulfone copolymer. The residue obtained by filtration was poured into 5,000 ml of distilled water. Concentrated hydrochloric acid was added to make the mixture pH 2, followed by filtration. The filtrate was washed until pH reaches 7. After washing with 6,000 ml of a 40% ethanol aqueous solution at 70° C. for three hours, the mixture was filtered. The residue was washed with ethanol and dried at 50° C. under vacuum to obtain a block copolymer of branched polyethylene oxide and an aromatic polysulfone. The yield was 151.66 g. The $\zeta$ potential of the resulting copolymer was −0.3 mV and the weight average molecular weight was 60,000.

Reference Example 3

(Preparation of Graft Sulfonated Polysulfone)

200 g of aromatic polysulfone (UDEL P-1700 manufactured by Amoco Engineering Polymers Inc.) was irradiated with γ-rays at 1 Mrd/hr for 10 hours in a dry ice atmosphere and added to a solution of 30 g of 3-sulfopropyl methacrylate (a grafting agent) in 1 kg of a 3:1 mixture of $H_2O$ and t-BOH. The mixture was reacted at 40° C. for four hours in a nitrogen atmosphere. After the reaction, the reaction product was washed with alcohol, then with water, and dried to obtain a grafted sulfonated polysulfone for preparation of a dope. The degree of sulfonation of the resulting polymer was 0.2.

Reference Example 4

(Preparation of Ethylene Sulfone-Propylene Sulfone Copolymer)

4.9 g of ethylene sulfide and 14.0 g of propylene sulfide (both manufactured by Kanto Kasei Co., Ltd.) were mixed with 254 mg of ethyl acetate in which 44.8 mg of magnesium perchlorate (manufactured by Wako Pure Chemical Industries, Ltd.) was dissolved. The mixture was stirred for five hours at 70° C. in a sealed container. The reaction product was dissolved in 40 ml of 1-methyl-2-pyrrolidone (manufactured by Wako Pure Chemical Industries, Ltd.) and added to 1,000 ml of ethanol to obtain a white precipitate of a polymer.

The precipitate was sufficiently washed with ethanol and ethanol was removed under reduced pressure at 60° C. to obtain 14.0 g of polysulfide. 1 g of the polysulfide was dissolved in 60 ml of 1-methyl-2-pyrrolidone. A mixture of 4 ml of a 30% hydrogen peroxide solution and 20 ml of formic acid was slowly added dropwise while stirring. The mixture immediately generated exothermic heat and the sulfide was oxidized into sulfone to produce a precipitate of an ethylene sulfone-propylene sulfone copolymer. The precipitate was purified by repeating a washing procedure consisting of centrifugation followed by replacing the supernatant three times and dried at 60° C. under reduced pressure for four hours to obtain 0.85 g of a white solid of ethylene sulfone-propylene sulfone copolymer (aliphatic polysulfone of the chemical formula 6). The weight average molecular weight of the resulting copolymer was 78,000.

Reference Example 5

(Preparation of Branched Polyethylene Oxide-Sulfonated Polysulfone Copolymer)

Sodium bis(2-chlorobenzenesulfonate)-5,5'-sulfonate was synthesized according to the method described in J. Polym. Sci., Part A: Polym. Chem., 31, 853-858 (1993).

A 1,000 ml three-necked separable flask was charged with 29.02 g of bisphenol A (Tokyo Kasei Kogyo Co., Ltd.), 36.61 g of 4,4'-dichlorodiphenylsulfone (Tokyo Kasei Kogyo Co., Ltd.), 11.86 g of the above sodium bis(2-chlorobenzenesulfonate)-5,5'-sulfonate, 52.76 g of potassium carbonate (Wako Pure Chemical Industries, Ltd.), 80.8 ml of toluene (Wako Pure Chemical Industries, Ltd.), and 194.6 ml of N-methyl-2-pyrrolidone (Tokyo Kasei Kogyo Co., Ltd.). The atmosphere in the flask was replaced with nitrogen while stirring the mixture for two hours. After maintaining the mixture at 155° C., toluene was refluxed for three hours, while removing water produced by azeotropic distillation from the mixture using a deanstack trap. The mixture was heated to 190° C. After removing toluene, the mixture was maintained at 190° C. for five hours to obtain both end-chlorinated sulfonated polysulfone (hereinafter referred to as polysulfone) prepolymer.

A 1,000 ml three-necked separable flask was charged with 129.84 g of polyethylene glycol #4000 (Tokyo Kasei Kogyo Co., Ltd., hydroxyl value 36 mg KOH/g), 26.74 g of tetrafunctional block copolymer obtained by progressive addition of propylene oxide and ethylene oxide to ethylenediamine (BASF, Tetronic 304: hydroxyl value 68 mg KOH/g), 200.03 g of potassium carbonate, 173.0 ml of toluene, and 340.6 ml of N-methyl-2-pyrrolidone. The atmosphere in the flask was replaced with nitrogen while stirring the mixture for two hours. After maintaining the mixture at 155° C., toluene was refluxed for three hours, while removing water produced by azeotropic distillation from the mixture using a deanstack trap. Next, 9.83 g of 4,4'-difluorodiphenylsulfone (Tokyo Kasei Kogyo Co., Ltd.) dissolved in 50 g of N-methyl-2-pyrrolidone was added. The mixture was heated to 190° C. After removing toluene over one hour, the mixture was maintained at 190° C. for five hours to obtain a branched polyethylene oxide prepolymer.

The reaction mixture of the branched polyethylene oxide prepolymer was added to the reaction mixture of the both end-chlorinated sulfonated prepolymer, followed by the addition of 100 ml of toluene. The atmosphere was replaced with nitrogen. After maintaining the reaction mixture at 155° C., toluene was refluxed for three hours, while removing water produced by azeotropic distillation from the mixture using a deanstack trap. The mixture was heated to 190° C. After removing toluene over one hour, the mixture was maintained at 190° C. for eight hours to obtain a branched polyethylene oxide-sulfonated polysulfone copolymer. The reaction mixture was slowly added dropwise to 10,000 ml of distilled water while stirring to obtain a fibrous branched polyethylene oxide-sulfonated polysulfone copolymer. The residue obtained by filtration was poured into 5,000 ml of distilled water. Concentrated hydrochloric acid was added to make the mixture pH 2, followed by filtration. The filtrate was washed until pH reaches 7. After stirring for washing in 6,000 ml of a 40% ethanol aqueous solution at 70° C. for three hours, the mixture was filtered. The residue was washed with ethanol and dried at 50° C. under vacuum to obtain a branched polyethylene oxide-sulfonated polysulfone copolymer. The yield was 215 g. The degree of sulfonation (DS) of the resulting polymer was 0.3 and weight average molecular weight was 37,000.

Examples for manufacturing asymmetric porous membranes using a double spinneret nozzle or triple spinneret nozzle are shown in Examples 1-7.

Example 1

A spinning solution consisting of 18 parts by weight of an aromatic polysulfone (UDEL P-1700 manufactured by Amoco Engineering Polymers Inc.), 7 parts by weight of a sulfonated polysulfone copolymer prepared according to the method described in Reference Example 1, 15 parts by weight of tetraethylene glycol, and 60 parts by weight of N-methyl-2-pyrrolidone was prepared. This spinning solution was maintained at 50° C. and extruded from a double cylindrical spinneret simultaneously with an inner cylinder fluid consisting of 50 parts by weight of water, 49.5 parts by weight of N-methyl-2-pyrrolidone, and 0.5 part by weight of a block copolymer of branched polyethylene oxide and an aromatic polysulfone prepared according to the method described in Reference Example 2. The extruded hollow fiber was caused to run through a hood saturated with water vapor at an average temperature of 40° C., immersed in water at 55° C. in a spinning bath installed 600 mm below the spinneret, and wound around a bobbin at a rate of 50 m/min. The wound hollow fiber was washed with hot water at 90° C. for 90 minutes and dried at 70° C. to obtain hollow fiber for evaluation. The hollow fiber obtained was evaluated according to the above-described method. The results are shown in Table 1.

Example 2

A spinning solution consisting of 15 parts by weight of an aromatic polysulfone (UDEL P-1700 manufactured by Amoco Engineering Polymers Inc.), 7 parts by weight of a sulfonated polysulfone copolymer prepared according to the method described in Reference Example 1, 8 parts by weight of a block copolymer of branched polyethylene oxide and an aromatic polysulfone prepared according to the method described in Reference Example 2, 10 parts by weight of tetraethylene glycol, and 60 parts by weight of N-methyl-2-pyrrolidone was prepared. This spinning solution was maintained at 50° C. and extruded from a double cylindrical spinneret simultaneously with an inner cylinder fluid consisting of 50 parts by weight of water, 49.5 parts by weight of N-methyl-2-pyrrolidone, and 0.5 part by weight of a block copolymer of branched polyethylene oxide and an aromatic polysulfone prepared according to the method described in Reference Example 2. The extruded hollow fiber was caused to run through a hood saturated with water vapor at an average temperature of 40° C., immersed in water at 55° C. in a spinning bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Example 3

A spinning solution consisting of 18 parts by weight of a graft sulfonated polysulfone prepared according to the method described in Reference Example 3, 30 parts by weight of tetraethylene glycol, and 52 parts by weight of N-methyl-2-pyrrolidone was prepared. This spinning raw fluid was maintained at 50° C. and extruded from a double cylindrical spinneret simultaneously with an inner cylinder fluid consisting of 50 parts by weight of water, 49.5 parts by weight of N-methyl-2-pyrrolidone, and 0.5 part by weight of a block copolymer of branched polyethylene oxide and an aromatic polysulfone prepared according to the method described in Reference Example 2. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Example 4

A spinning solution consisting of 5 parts by weight of an ethylene sulfone-propylene sulfone copolymer (an aliphatic polysulfone of the chemical formula 6) prepared according to the method described in Reference Example 4, 18 parts by weight of an aromatic polysulfone (UDEL P-1700 manufactured by Amoco Engineering Polymers Inc.), 15 parts by weight of tetraethylene glycol, and 62 parts by weight of N-methyl-2-pyrrolidone was prepared. The aliphatic polysulfone was used for this spinning solution as is without sulfonating, since the polysulfone had a strong negative charge. This spinning solution was maintained at 50° C. and extruded from a double cylindrical spinneret simultaneously with an inner cylinder fluid consisting of 50 parts by weight of water, 49.5 parts by weight of N-methyl-2-pyrrolidone, and 0.5 part by weight of a block copolymer of branched polyethylene oxide and an aromatic polysulfone prepared according to the method described in Reference Example 2. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Example 5

A spinning solution consisting of 18 parts by weight of an aromatic polysulfone (UDEL P-1700, manufactured by Amoco Engineering Polymers Inc.), 7 parts by weight of a sulfonated polysulfone prepared according to the method described in Reference Example 1, 15 parts by weight of tetraethylene glycol, and 60 parts by weight of N-methyl-2-pyrrolidone was prepared. This spinning solution was maintained at 50° C. and extruded from a double cylindrical spinneret nozzle simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 55° C. in a spinning bath installed 600 mm below the spinneret, and wound around a bobbin at a rate of 50 m/min. The wound hollow fiber was washed with hot water at 90° C. for 90 minutes and dried at 70° C. to obtain a hollow fiber. A mini-module was prepared from the hollow fiber. After priming by thoroughly charging a mixed solution of 70 parts by weight of water at 50° C., 29.5 parts by weight of N-methyl-2-pyrrolidone, 0.5 part of a block copolymer of branched polyethylene oxide and an aromatic polysulfone prepared according to the method described in Reference Example 2 into the hollow fiber, the mini-module was washed with water and dried to obtain the hollow fiber for evaluation. The hollow fiber obtained was evaluated according to the above-described method. The results are shown in Table 1.

Example 6

A spinning solution for extruding from an outer cylinder of a triple spinneret nozzle consisting of 18 parts by weight of aromatic polysulfone (UDEL P-1700 manufactured by Amoco Engineering Polymers Inc.), 7 parts by weight of a sulfonated polysulfone prepared according to the method described in Reference Example 1, 10 parts by weight of tetraethylene glycol, and 65 parts by weight of N-methyl-2-pyrrolidone was prepared and maintained at 50° C. Another spinning solution for extruding from a middle cylinder of the triple cylindrical spinneret consisting of 18 parts by weight of an aromatic polysulfone (P-1700 manufactured by Amoco Performance Products Inc.), 7 parts by weight of a block copolymer of branched polyethylene oxide and an aromatic polysulfone prepared according to the method described in Reference Example 2, 10 parts by weight of tetraethylene glycol, and 65 parts by weight of N-methyl-2-pyrrolidone was prepared and maintained at 50° C. These spinning solution were extruded from the triple cylindrical spinneret simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 60° C. in a bath installed 1,100 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Example 7

A spinning solution consisting of 5 parts by weight of a branched polyethylene oxide-sulfonated polysulfone copolymer prepared according to the method described in Reference Example 5, 18 parts by weight of an aromatic polysulfone (UDEL P-1700 manufactured by Amoco Engineering Polymers Inc.), 15 parts by weight of tetraethylene glycol, and 62 parts by weight of N-methyl-2-pyrrolidone was prepared. This spinning solution was maintained at 50° C. and extruded from a double spinneret cylindrical simultaneously with an inner cylinder fluid consisting of 50 parts by weight of water, 49.5 parts by weight of N-methyl-2-pyrrolidone, and 0.5 part by weight of a block copolymer of branched polyalkylene oxide and an aromatic polysulfone prepared according to the method described in Reference Example 2. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Comparative Example 1

A homogeneous spinning solution consisting of 18 parts by weight of an aromatic polysulfone (UDEL P-1700 manufactured by Amoco Engineering Polymers Inc.), 7 parts by weight of polyvinyl pyrrolidone, and 76 parts by weight of N-methyl-2-pyrrolidone was prepared. This spinning solution was maintained at 50° C. and extruded from a double cylindrical spinneret simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes, dipped in a 20 wt % glycerol aqueous solution at 60° C. for one hour, and dried at 70° C. to obtain a hollow fiber for evaluation. The hollow fiber obtained was evaluated according to the above-described method. The results are shown in Table 1.

Comparative Example 2

The same spinning solution as in Example 1 was maintained at 50° C. and extruded from a double cylindrical spinneret simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 55° C. in a spinning bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Comparative Example 3

The same spinning solution as in Example 2 was maintained at 50° C. and extruded from a double cylindrical spinneret simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Comparative Example 4

The same spinning solution as in Example 3 was maintained at 50° C. and extruded from a double cylindrical spinneret simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Comparative Example 5

The same spinning solution as in Example 4 was maintained at 50° C. and extruded from a double spinneret nozzle simultaneously with an inner cylinder fluid consisting of 50 parts by weight of water and 50 parts by weight of N-methyl-2-pyrrolidone. The extruded hollow fiber was caused to run through a hood saturated with water vapor at an average temperature of 40° C., immersed in water at 55° C. in a bath installed 600 mm below the spinneret, and wound around a bobbin at a rate of 50 m/min. The wound hollow fiber was washed with hot water at 90° C. for 90 minutes and dried at 70° C. to obtain a hollow fiber for evaluation. The hollow fiber obtained was evaluated according to the above-described method. The results are shown in Table 1.

Example 8

Figure 2:
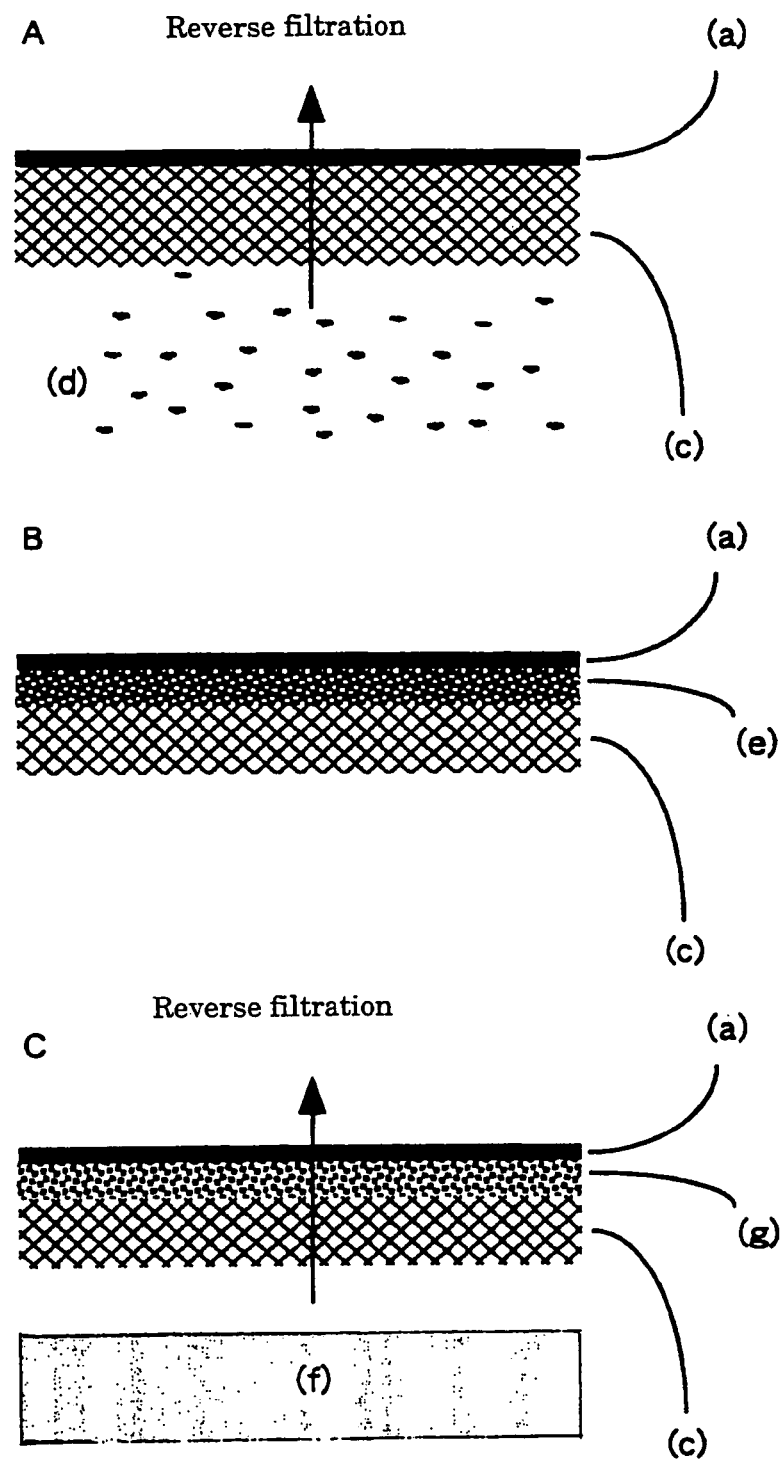
FIG. 2 is a schematic view showing a method for introducing negative charges to immediately below the dense layer of the asymmetric porous membrane of the present invention.

An embodiment of the membrane manufacturing method and membrane properties of Example 8 will be described referring to FIG. 2.

As a substrate membrane, a polysulfone hollow fiber membrane with a gradient asymmetric structure having a dense layer (a) inside and a supporting later (c) outside of the existing membrane, which is a ultrafilter membrane in which the fractional molecular weight of the dense layer (a) is 60-100 kD, was selected. Such a membrane cannot be used in a usual blood treatment because of too large an amount of albumin leaked (a large sieving coefficient).

A charged layer (e) was introduced into the supporting layer immediately below the dense layer of the above mem-

TABLE 1

|  | LDH (IU/m$^2$) | Amount of adsorbed protein (mg/m$^2$) | BKN production*$^1$ | β2MG SC | α1MG SC | Albumin SC | Cutt off MW (Mw × 10$^{-3}$) | XPS*$^2$ | ζ Potential*$^3$ (mV) |
|---|---|---|---|---|---|---|---|---|---|
| Example 1 | 1.2 | 1.4 | 2.1 | 1.00 | 0.22 | 0.004 | 40 ± 5 | 7.8 | −4 |
| Example 2 | 1.0 | 1.3 | 1.9 | 1.00 | 0.24 | 0.004 | 40 ± 5 | 8.5 | −3 |
| Example 3 | 1.2 | 1.3 | 2.1 | 1.00 | 0.18 | 0.005 | 40 ± 5 | 8.0 | −3 |
| Example 4 | 2.0 | 1.8 | 2.3 | 1.00 | 0.18 | 0.005 | 40 ± 5 | 7.1 | −5 |
| Example 5 | 1.3 | 1.5 | 2.2 | 1.00 | 0.22 | 0.004 | 40 ± 5 | 7.9 | −4 |
| Example 6 | 1.5 | 1.6 | 2.1 | 1.00 | 0.18 | 0.005 | 40 ± 5 | 7.5 | −4 |
| Example 7 | 1.2 | 1.8 | 2.1 | 1.00 | 0.16 | 0.005 | 40 ± 5 | 7.8 | −4 |
| Comparative Example 1 | 5.5 | 4.2 | 2.1 | 1.00 | 0.09 | 0.011 | 40 ± 5 | 1.8 | −1 |
| Comparative Example 2 | 70.2 | 4.8 | 16.6 | 1.00 | 0.19 | 0.006 | 40 ± 5 | 5.9 | −10 |
| Comparative Example 3 | 84.5 | 7.5 | 8.5 | 1.00 | 0.20 | 0.006 | 40 ± 5 | 5.8 | −7 |
| Comparative Example 4 | 82.2 | 5.4 | 5.8 | 1.00 | 0.18 | 0.006 | 40 ± 5 | 5.6 | −9 |
| Comparative Example 5 | 200 | 5.8 | 69.8 | 1.00 | 0.18 | 0.006 | 40 ± 5 | 5.5 | −13 |

*$^1$BKN production is a fraction of the BKN value (1) of the non-contacted blood used as a control.
*$^2$XPS indicates the value [N]/[S] in Comparative Example 1 and [O]/[S] in Examples and other Comparative Examples.
*$^3$The value for a porous membrane at pH 7.4.

It can be seen that bradykinin production was suppressed at a low level in the method of Comparative Example 1 because negative charges have not been introduced. However, the hollow fiber of the Comparative Example 1 leaked much albumin, resulting in low fractionation performance. In the methods of Comparative Examples 2-5, on the other hand, the amount of leaked albumin was suppressed at a low level and fractionation performance was improved due to the effect of negative charges. However, because sulfone groups having negative charges are localized on the inner surface or the blood contact surface, not only was bradykinin production increased, but also LDH and protein adsorption were increased. In either case, these porous membranes could not be put into practice.

In contrast, in the products obtained in Examples 1-7, leaking of albumin was considerably suppressed and fractionation performance was improved due to static repulsion of introduced negative charges, and bradykinin production, LDH, and protein adsorption were significantly suppressed. These results indicate that the method of the present invention can excellently separate and remove low molecular weight plasma proteins and later stage glycosylated proteins that cause amyloidosis, without inducing biological reactions undesirable for living bodies such as blood clotting, complement activity, and bradykinin production, while suppressing leakage of plasma albumin to the minimum.

Next, examples for manufacturing an asymmetric porous membrane by introducing a solution of negatively charged materials from opposite side of the dense layer will be described.

brane. Specifically, a charged polymer solution (d) of an aqueous solution of a dilute (about 1%) proteoheparin with a high molecular weight (about 200-500 kD) was prepared. Then, as shown in FIG. 2A, the polymer solution (d) was reversely filtered from outside to inside of the hollow fiber membrane (in the direction of the arrow) to cause proteoheparin to be captured by the supporting layer (c) immediately below the dense layer of the membrane as negatively charged molecules, thereby forming a charged layer (e) shown in FIG. 2B.

Immediately following that, a fixing solution (0.075 M sodium metaperiodate-0.037 M lysine-pH 6.2 buffer solution) (f) was reversely filtered (in the direction of the arrow) in the same manner, as shown in FIG. 2C, to convert the diol group on the heparin sugar chain 5-ring into an aldehyde group by oxidizing with sodium metaperiodate and crosslink polysaccharide chains of different molecules by a lysine molecule having two amino groups, whereby the polymer molecules were entwined in the mesh structure of polysulfone polymer and immobilized immediately below the dense layer. Since sodium metaperiodate also oxidizes the bisphenol ether bond of polysulfone polymer into an aldehyde, this aldehyde group formed a linkage with the aldehyde groups of the oxidized heparin via a lysine bridge. A part of heparin molecules were directly fixed onto the membrane via the chemical bond. Excess fixing solution was removed by sufficiently washing with water.

When heparin with a molecular weight (7-25 kD) that is smaller than proteoheparin was used as a negatively charged substance, the heparin molecules were preferably enlarged in advance by polymerization using a crosslinking agent, whereby the heparin molecules were effectively captured by a supporting layer (a porous layer).

The charged membrane prepared in this manner was an asymmetric porous membrane having a dense layer with a fractional molecular weight of 60-100 kD and a thickness of 1 μm as the innermost layer and containing negative charges in a supporting layer immediately below the dense layer and having a pore diameter larger than that of the dense layer (fractional molecular weight: 100 kD or more). This charged membrane satisfied the basic characteristics shown in FIG. 1.

If the asymmetric porous membrane prepared in this manner was used for hemocatharsis (hemodialysis, blood filtration, or hemodialysis filtration), the removal rate of toxins ranging from small to large molecular weight toxins with a molecular weight of 30-80 kD can be increased, while suppressing loss of albumin with a molecular weight of 66 kD to an allowable range (2-6 g).

Example 9

Among polyether sulfone hollow fiber membranes with a gradient asymmetric structure having a dense layer inside and a supporting later outside of the existing membrane, a ultra-filter membrane in which the cutt off molecular weight of the dense layer is 20-40 kD was selected. An aqueous solution of a dilute (about 1%) heparan sulfate proteoglycan with a high molecular weight (about 100-200 kD) was prepared and reversely filtered from outside to inside the hollow fiber membrane to cause the heparan sulfate proteoglycan to be captured by the supporting layer immediately below the dense layer of the membrane, thereby forming a charged layer. During reverse filtration, a crosslinking promoter (0.075 M sodium metaperiodate-0.037 M lysine-pH 6.2 buffer solution) was fed from the hollow fiber membrane side and dispersed below the dense layer to initiate the polymerization reaction. This method could immobilize heparin immediately below the dense layer with certainty.

By filtration in the same manner, the diol group on the heparin sugar chain 5-ring was converted into an aldehyde group by oxidizing with sodium metaperiodate and polysaccharide chains of different molecules were crosslinked by a lysine molecule having two amino groups, whereby the polymer molecules were entwined in the mesh structure of polysulfone polymer and immobilized immediately below the dense layer. Since sodium metaperiodate also oxidized the bisphenol ether bond of polyether sulfone polymer into an aldehyde, this aldehyde group formed a linkage with the aldehyde groups of the oxidized heparin via a lysine bridge. A part of heparan sulfate molecules were directly fixed onto the membrane via the chemical bond. Finally excessive fixing solution was removed by sufficiently washing with water.

The charged membrane prepared in this manner was an asymmetric porous membrane having a dense layer with a cutt off molecular weight of 20-40 kD and a thickness of 1 μm as the innermost layer and containing negative charges in a supporting layer immediately below the dense layer and having a pore diameter (cutt off molecular weight: 40 kD or more) larger than that of the dense layer. This charged membrane satisfied the basic characteristics shown in FIG. 1.

If urine, for example, is filtered using the asymmetric porous membrane thus prepared, α1-microglobulin, a protein with a molecular weight of 33 kD contained in a large amount in urine, and β2-microglobulin, an acidic protein with a molecular weight of 11.7 kD, can be blocked at the same time, and peptides and proteins with a molecular weight of 20 kD or less contained in urine in a very small amount can be separated in the filtrate at a high yield.

The effect of the membrane having a dense layer with a cutt off molecular weight of about 60-80 kD and a thickness of 1 μm and a negatively charged layer immediately below the dense layer with a cutt off molecular weight of about 80 to several hundred kD in blood with an objective of curing diseases such as renal failure or hepatic failure is shown below. Hemofiltration, hemodiafiltration, and hemodialysis can be selected as the blood purification therapy. The hemofiltration and hemodialysis filtration are more effective.

Since the separating membrane of the present invention has a large pore size in the dense layer as compared with conventional blood purifying membranes, removal performance of large toxic molecules with a molecular weight of 20 kD or more that had been difficult to remove using a conventional treatment has been significantly improved in the present invention.

Figure 3:
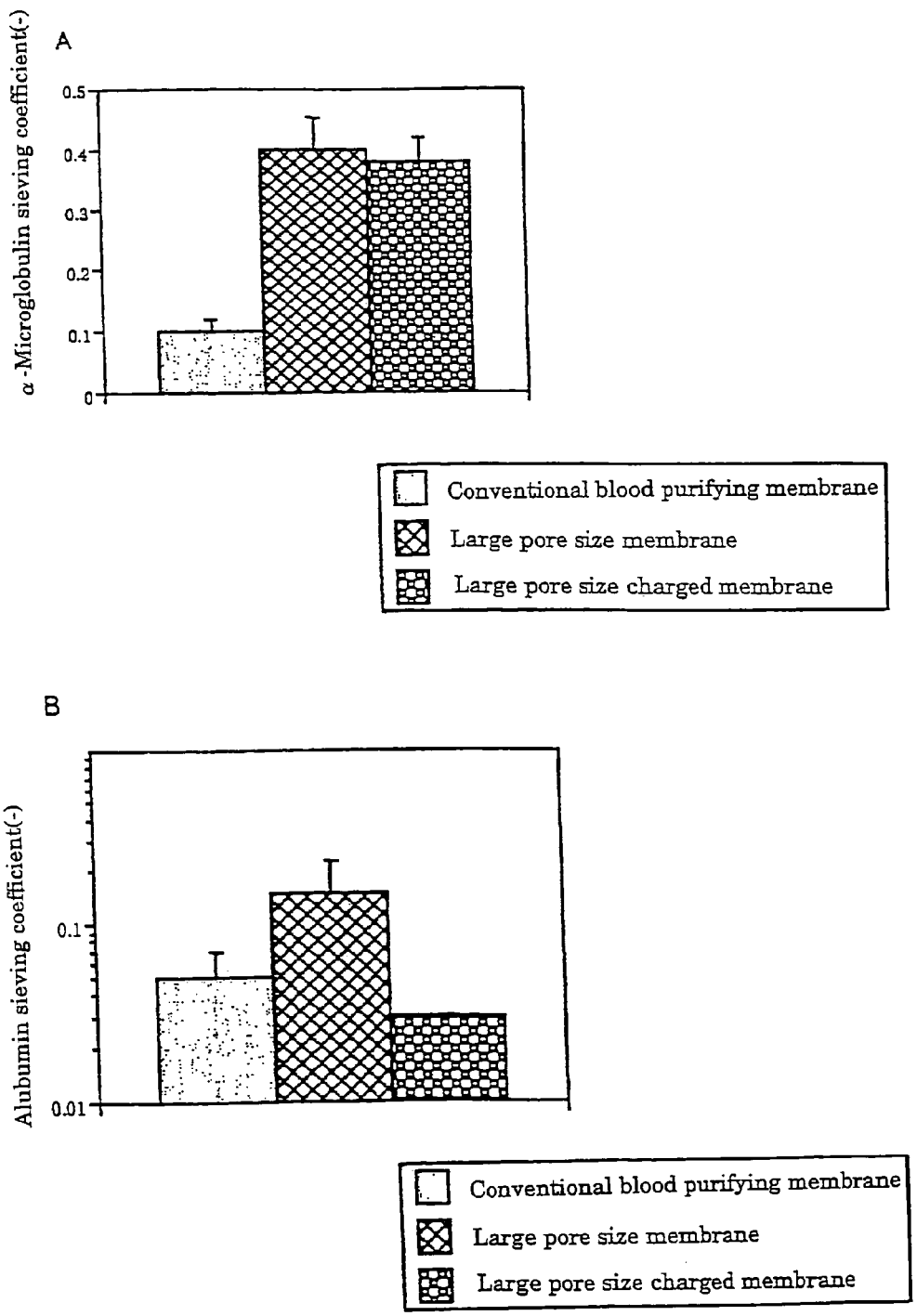
FIG. 3 is a graph showing the sieving coefficient of α1-microglobulin and albumin for various membranes.

FIG. 3A shows the results of experiment to determine the sieving coefficient (a membrane permeation index determined by dividing the concentration of a solute in a filtrate by the concentration of the solute in a loaded liquid) for α1-microglobulin with a molecular weight of 33 kD when human plasma was filtered. The following three filter samples were used.

(1) A blood filter membrane having the highest performance among commercially available conventional blood filter membranes (common blood filter membrane). The material is a polysulfone membrane with a cut off molecular weight of 10-20 kD.

(2) A large pore size ultrafilter membrane with an asymmetric porous structure, not used for blood filtration. The material is a polyether sulfone membrane with a cut off molecular weight of 60-80 kD. and (3) A large pore size ultrafilter membrane with an asymmetric porous structure, with a negatively charged layer introduced (large pore size charged membrane).

The α1-microglobulin sieving coefficient was naturally high in the latter two large pore size membranes. These two membranes possessed almost the same sieving coefficient value, indicating that the sieving function is not affected by introducing a negatively charged substance.

On the other hand, although the dense layer of the large pore size ultrafilter membrane with an asymmetric porous structure allows albumin molecules to permeate therethrough, the albumin blocking performance can be optimally controlled due to electrical repulsion of albumin molecules by the negatively charged layer immediately below the dense layer. FIG. 3B shows the results of the albumin sieving coefficient determination of the above three membranes. As can be seen from the Figure, the large pore size charged membrane (3) with the same large pore size structure as that of the large pore size membrane (2) suppressed albumin permeation to a level equivalent to or lower than the common blood filter membrane due to introduction of negative charges. As a result, performance of separating macromolecular toxins (for example, α1-microglobulin) that is the subject to be removed but can be removed only with difficulty by the molecular size difference from albumin that is the subject to be blocked has remarkably increased.

INDUSTRIAL APPLICABILITY

The asymmetric porous membrane of the present invention can separate a specific solute and/or dispersoid from a multicomponent solution. The membrane has a double barrier structure, one a size barrier and the other a charge barrier of negative charges. In addition, negative charges are present inside the membrane, with at least the outermost surface of the dense layer being substantially free from electric charges.

As a result, the asymmetric porous membrane of the present invention exhibits remarkably improved performance to separate a solute and/or dispersoid from a multicomponent solution, while preventing a solution to be processed from chemically or biologically reacting due to electric charges.

The asymmetric porous membrane of the present invention can be used particularly preferably when the liquid to be processed is blood and can excellently separate and remove low molecular weight plasma proteins and later stage glycosylated proteins that cause amyloidosis, without inducing biological reactions undesirable for living bodies such as blood clotting, complement activity, and bradykinin production, while suppressing leakage of plasma albumin to the minimum.

The invention claimed is:

1. A method for manufacturing an asymmetric porous membrane, comprising providing a porous substrate membrane with an asymmetric structure mainly made from a synthetic polymer substantially free from electric charges and having a dense layer on the side on which a liquid is loaded and filtering or diffusing a solution of a negatively charged polymer that can be blocked by the dense layer from the side opposite to the dense layer to block the negatively charged polymer from permeating through the dense layer, thereby introducing negative charges to the part excluding the dense layer and immobilizing the negatively charged material to the part excluding the dense layer.

2. The method according to claim 1, wherein the negative charges are introduced at a high density immediately below the dense layer by blocking the negatively charged polymer immediately below the dense layer.

* * * * *